(12) United States Patent
Motohashi et al.

(10) Patent No.: US 9,324,026 B2
(45) Date of Patent: Apr. 26, 2016

(54) HIERARCHICAL LATENT VARIABLE MODEL ESTIMATION DEVICE, HIERARCHICAL LATENT VARIABLE MODEL ESTIMATION METHOD, SUPPLY AMOUNT PREDICTION DEVICE, SUPPLY AMOUNT PREDICTION METHOD, AND RECORDING MEDIUM

(71) Applicant: NEC Corporation, Tokyo (JP)

(72) Inventors: Yosuke Motohashi, Tokyo (JP); Satoshi Morinaga, Tokyo (JP); Ryohei Fujimaki, Tokyo (JP); Riki Eto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 396 days.

(21) Appl. No.: 14/032,295

(22) Filed: Sep. 20, 2013

(65) Prior Publication Data

US 2015/0088789 A1      Mar. 26, 2015

(51) Int. Cl.
*G06N 5/02* (2006.01)
*G06N 99/00* (2010.01)

(52) U.S. Cl.
CPC ............... *G06N 5/02* (2013.01); *G06N 99/005* (2013.01)

(58) Field of Classification Search
None
See application file for complete search history.

(56) References Cited

U.S. PATENT DOCUMENTS

2013/0132316 A1   5/2013   Wang et al.
2013/0211801 A1   8/2013   Fujimaki et al.

FOREIGN PATENT DOCUMENTS

| JP | 10143490 A | 5/1998 |
|---|---|---|
| JP | 4139410 B2 | 8/2008 |
| JP | 2010-128779 A | 6/2010 |
| WO | 2012/128207 A1 | 9/2012 |

OTHER PUBLICATIONS

Zhu, Long, et al. "Latent hierarchical structural learning for object detection." Computer Vision and Pattern Recognition (CVPR), 2010 IEEE Conference on. IEEE, 2010.*
Ryohei Fujimaki, et al., "Factorized Asymptotic Bayesian Inference for Mixture Modeling", Proceedings of the Fifteenth International Conference on Artificial Intelligence and Statistics (AISTATS), Mar. 2012, pp. 400-408, vol. XX of JMLR.
International Search Report dated Nov. 25, 2014 issued in counterpart International Patent Application No. PCT/JP2014/004494.

* cited by examiner

*Primary Examiner* — Kakali Chaki
*Assistant Examiner* — Kevin W Figueroa
(74) *Attorney, Agent, or Firm* — Sughrue Mion, PLLC

(57) ABSTRACT

A hierarchical latent structure setting unit 81 sets a hierarchical latent structure that is a structure in which latent variables are represented by a tree structure and components representing probability models are located at nodes of a lowest level of the tree structure. A variational probability computation unit 82 computes a variational probability of a path latent variable that is a latent variable included in a path linking a root node to a target node in the hierarchical latent structure. A component optimization unit 83 optimizes each of the components for the computed variational probability. A gating function optimization unit 84 optimizes a gating function model that is a model for determining a branch direction according to the multivariate data in a node of the hierarchical latent structure, based on the variational probability of the latent variable in the node.

15 Claims, 19 Drawing Sheets

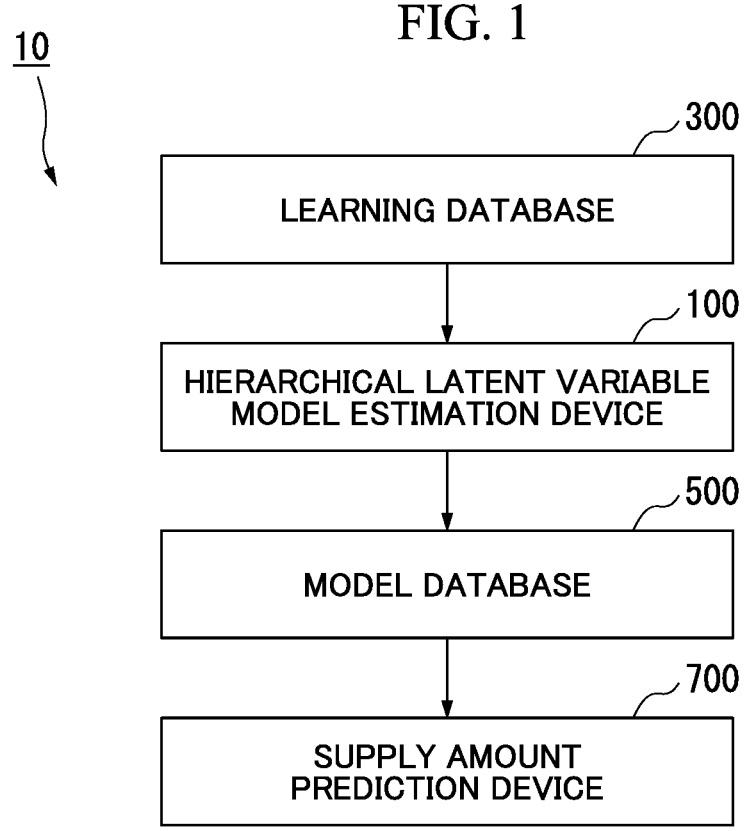

FIG. 2A

| DATE AND TIME | PRODUCT ID | STORE ID | CUSTOMER ID | SALES | UNIT PRICE | SUBTOTAL | RECEIPT NUMBER | ... |
|---|---|---|---|---|---|---|---|---|
| 20130513 05:21 | G00545 | S0041 | C0014 | 1 | 180 | 180 | R0012 | |
| 20130513 05:21 | G00553 | S0041 | C0014 | 2 | 240 | 480 | R0012 | |

SUPPLY TABLE

FIG. 2B

| DATE AND TIME | TEMPERATURE | MAXIMUM TEMPERATURE OF THE DAY | MINIMUM TEMPERATURE OF THE DAY | PRECIPITATION | WEATHER | DISCOMFORT INDEX | ... |
|---|---|---|---|---|---|---|---|
| 20130513 01:00 | 17.5 | 24.5 | 15.6 | 0 | CLOUD | 45.3 | |
| 201.30513 04:00 | 16.2 | 24.5 | 15.6 | 13 | RAIN | 78.8 | |

WEATHER TABLE

FIG. 2C

| CUSTOMER ID | AGE | ADDRESS | FAMILY MEMBER | ...... |
|---|---|---|---|---|
| C0014 | 25 | SAITAMA-KEN······ | | |
| C0015 | 37 | TOKYO······ | | |

CUSTOMER TABLE

FIG. 2D

| DATE AND TIME | PRODUCT ID | STOCK QUANTITY | INCREASED OR DECREASED VALUE | ... |
|---|---|---|---|---|
| 20130513 05:00 | G00545 | 3 | −1 | |
| 20130513 05:21 | G00553 | 4 | −2 | |

STOCK TABLE

FIG. 2E

| STORE ID | STORE NAME | ADDRESS | TYPE | SPACE | NUMBER OF PARKING SPACES | ... |
|---|---|---|---|---|---|---|
| S0041 | FUTABA STATION STORE | TOKYO... | STATION | 150 | 4 | |
| S0042 | MITSUBA GS STORE | KANAGAWA-KEN... | COMPOSITE TYPE | 100 | 8 | |

STORE ATTRIBUTION TABLE

FIG. 2F

| DATE | INFORMATION TYPE | VALUE | PRODUCT ID | STORE ID |
|---|---|---|---|---|
| 20130513 | PUBLIC HOLIDAY | 1 | | |
| 20130513 | PROMOTION | 1 | G00545 | S0041 |
| 20130513 | EVENT OPENED NEAR THE STORE | 1 | | S0041 |

DATE ATTRIBUTION TABLE

FIG. 2G

| PRODUCT ID | PRODUCT NAME | LARGE CLASSIFICATION | MIDDLE CLASSIFICATION | SMALL CLASSIFICATION | UNIT PRICE | COST PRICE | ... |
|---|---|---|---|---|---|---|---|
| G00545 | SOFT JUMBO STEAMED BREAD | FOOD | BREAD | STEAMED BREAD | 120 | 50 | |
| G00553 | YAKISOBA BREAD | FOOD | BREAD | COOKED BREAD | 105 | 40 | |

PRODUCT ATTRIBUTION TABLE

HIERARCHICAL LATENT VARIABLE MODEL ESTIMATION DEVICE, HIERARCHICAL LATENT VARIABLE MODEL ESTIMATION METHOD, SUPPLY AMOUNT PREDICTION DEVICE, SUPPLY AMOUNT PREDICTION METHOD, AND RECORDING MEDIUM

BACKGROUND

1. Field

The present invention relates to a hierarchical latent variable model estimation device, a hierarchical latent variable model estimation method, a supply amount prediction device, a supply amount prediction method, and a recording medium.

2. Description of Related Art

A supply amount of a product in a store is accumulated data observed according to various factors. Here, sales is an example of a supply amount. Thus, the data is accumulated as observation values resulting not from one factor but from various factors. s another example, analyzing correlations between sales and weather and/or time of day enables reduction of running out of stock or overstocking. Examples of the supply amount include sales of products, shipments, sales proceeds, and the total sales amount of a store.

Accordingly, a technology for predicting future demands from past sales data (for example, see Japanese Patent No. 4139410 and Japanese Unexamined Patent Application, First Publication No. 2010-128779). Japanese Patent No. 4139410 discloses a technology for computing a proper amount of stock, using a prediction model according to information such as the day, date, or promotion information. Japanese Unexamined Patent Application, First Publication No. 2010-128779 discloses a technology for computing a sales using the optimal multiple regression type extracted based on information such as the number of marketing specialists, store area, traffic, or area population.

Further, a method for determining the type of observation probability by approximating, for a mixture model which is a typical example of a latent variable model, a complete marginal likelihood function and maximizing its lower bound (lower limit) is described in Ryohei Fujimaki, Satoshi Morinaga: Factorized Asymptotic Bayesian Inference for Mixture Modeling. Proceedings of the Fifteenth International Conference on Artificial Intelligence and Statistics (AISTATS), March 2012 and PCT International Publication No. WO 2012/128207.

SUMMARY

According to the technology disclosed in Japanese Patent Publication No. 4139410 and Japanese Unexamined Patent Application, First Publication No. 2010-128779, prediction of sales is performed using prediction models different for each day, season, and weather information. A designer or a user of the system determines which information to be used for classifying the prediction models, based on expert opinion. Thus, it is difficult to set an appropriate reference to classify the prediction models. In addition, in a case where the reference for classifying the prediction models is not appropriate, reliability of predicted results may decrease.

Even when the method described in Factorized Asymptotic Bayesian Inference for Mixture Modeling and PCT International Publication No. WO 2012/128207 is used, there is still a problem in that the model selection problem for a model including hierarchical latent variables cannot be solved. This is because the method described in Factorized Asymptotic Bayesian Inference for Mixture Modeling and PCT International Publication No. WO 2012/128207 does not take hierarchical latent variables into account, and so it is unable to evidently establish a computational procedure. Besides, since the method described in Factorized Asymptotic Bayesian Inference for Mixture Modeling and PCT International Publication No. WO 2012/128207 is based on a strong assumption that it is not applicable to the case where there are hierarchical latent variables, theoretical justification is lost if this method is simply applied.

An object is to provide a hierarchical latent variable model estimation device, a hierarchical latent variable model estimation method, a supply amount prediction device, a supply amount prediction method, and a recording medium that can solve the aforementioned problems.

A first exemplary aspect is a hierarchical latent variable model estimation device for estimating a hierarchical latent variable model for predicting a supply amount of a product, the hierarchical latent variable model estimation device including: a study data input unit for inputting data for study which is a plurality of combinations of a response variable which is a known supply amount of a product and one or more explanatory variables which are information items which can influence the supply amount; a hierarchical latent structure setting unit for setting a hierarchical latent structure that is a structure in which latent variables are represented by a tree structure and components representing probability models are located at nodes of a lowest level of the tree structure; a variational probability computation unit for computing a variational probability of a path latent variable that is a latent variable included in a path linking a root node to a target node in the hierarchical latent structure, based on data for study input by the study data input unit and the components; a component optimization unit for optimizing each of the components for the computed variational probability, based on the data for study input by the study data input unit; and a gating function optimization unit for optimizing a gating function model that is a model for determining a branch direction according to the explanatory variables in a node of the hierarchical latent structure, based on the variational probability of the latent variable in the node.

A second exemplary aspect is a hierarchical latent variable model estimation method for estimating a hierarchical latent variable model for predicting a supply amount of a product, the hierarchical latent variable model estimation method including: inputting data for study which is a plurality of combinations of a response variable which is a known supply amount of a product and one or more explanatory variables which are information items which can influence the supply amount; setting a hierarchical latent structure that is a structure in which latent variables are represented by a tree structure and components representing probability models are located at nodes of a lowest level of the tree structure; computing a variational probability of a path latent variable that is a latent variable included in a path linking a root node to a target node in the hierarchical latent structure, based on the input data for study and the components; optimizing each of the components for the computed variational probability, based on the input data for study; and optimizing a gating function model that is a model for determining a branch direction according to the explanatory variables in a node of the hierarchical latent structure, based on the variational probability of the latent variable in the node.

A third exemplary aspect is a non-transitory tangible recording medium having recorded thereon a hierarchical latent variable model estimation program for estimating a hierarchical latent variable model for predicting a supply amount of a product, the hierarchical latent variable model estimation program causing a computer to execute: a data for study input process of inputting data for study which is a plurality of combinations of a response variable which is a known supply amount of a product and one or more explanatory variables which are information items which can influence the supply amount; a hierarchical latent structure setting process of setting a hierarchical latent structure that is a structure in which latent variables are represented by a tree structure and components representing probability models are located at nodes of a lowest level of the tree structure; a variational probability computation process of computing a variational probability of a path latent variable that is a latent variable included in a path linking a root node to a target node in the hierarchical latent structure, based on the data for study input by a study data input unit and the components; a component optimization process of optimizing each of the components for the computed variational probability, based on the data for study input by the study data input unit; and a gating function optimization process of optimizing a gating function model that is a model for determining a branch direction according to the multivariate data in a node of the hierarchical latent structure, based on the variational probability of the latent variable in the node.

A fourth exemplary aspect is a supply amount prediction device for predicting a supply amount of a product, the supply amount prediction device including: a prediction data input unit for inputting data for prediction which are one or more explanatory variables which are information items which can influence a supply amount of a product; a component determination unit for determining components to be used for prediction of the supply amount, based on a hierarchical latent structure that is a structure in which latent variables are represented by a tree structure and components representing probability models are located at nodes of a lowest level of the tree structure, a gating function for determining a branch direction in a node of the hierarchical latent structure, and the data for prediction; and a supply amount prediction unit for predicting the supply amount, based on the component determined by the component determination unit and the data for prediction.

A fifth exemplary aspect is a supply amount prediction method for predicting a supply amount of a product, the supply amount prediction method including: inputting data for prediction which are one or more explanatory variables which are information items which can influence the supply amount of a product; determining components to be used for prediction of the supply amount, based on a hierarchical latent structure that is a structure in which latent variables are represented by a tree structure and components representing probability models are located at nodes of a lowest level of the tree structure, a gating function for determining a branch direction in a node of the hierarchical latent structure, and the data for prediction; and predicting the supply amount, based on the component determined and the data for prediction.

A sixth exemplary aspect is a non-transitory tangible recording medium having recorded thereon a supply amount prediction program for predicting a supply amount of a product, the supply amount prediction program causing a computer to execute: a data for prediction input process of inputting data for prediction which are one or more explanatory variables which are information items which can influence the supply amount of a product; a component determination process of determining components to be used for prediction of the supply amount, based on a hierarchical latent structure that is a structure in which latent variables are represented by a tree structure and components representing probability models are located at nodes of a lowest level of the tree structure, a gating function for determining a branch direction in a node of the hierarchical latent structure, and the data for prediction; and a supply amount prediction process of predicting the supply amount, based on the component determined by the component determination unit and the data for prediction.

A seventh exemplary aspect is a supply amount prediction system for predicting a supply amount of a product, the supply amount prediction system including: a study data input unit for inputting data for study which is a plurality of combinations of a response variable which is a known supply amount of a product and one or more explanatory variables which are information items which can influence the supply amount; a hierarchical latent structure setting unit for setting a hierarchical latent structure that is a structure in which latent variables are represented by a tree structure and components representing probability models are located at nodes of a lowest level of the tree structure; a variational probability computation unit for computing a variational probability of a path latent variable that is a latent variable included in a path linking a root node to a target node in the hierarchical latent structure, based on data for study input by the study data input unit and the components; a component optimization unit for optimizing each of the components for the computed variational probability, based on the data for study input by the study data input unit; a gating function optimization unit for optimizing a gating function model that is a model for determining a branch direction according to the explanatory variables in a node of the hierarchical latent structure, based on the variational probability of the latent variable in the node; a prediction data input unit for inputting data for prediction which are one or more explanatory variables which are information items which can influence the supply amount of a product; a component determination unit for determining components to be used for prediction of the supply amount, among the components optimized by the component optimization unit, based on the gating function optimized by the gating function optimization unit and the data for prediction; and a supply amount prediction unit for predicting the supply amount, based on the component determined by the component determination unit and the data for prediction.

An eighth exemplary aspect is a supply amount prediction method for predicting a supply amount of a product, the supply amount prediction method including: inputting data for study which is a plurality of combinations of a response variable which is a known supply amount of a product and one or more explanatory variables which are information items which can influence the supply amount; setting a hierarchical latent structure that is a structure in which latent variables are represented by a tree structure and components representing probability models are located at nodes of a lowest level of the tree structure; computing a variational probability of a path latent variable that is a latent variable included in a path linking a root node to a target node in the hierarchical latent structure, based on the input data for study and the components; optimizing each of the components for the computed variational probability, based on the input data for study; optimizing a gating function model that is a model for determining a branch direction according to the explanatory variables in a node of the hierarchical latent structure, based on the variational probability of the latent variable in the node; inputting data for prediction which are one or more explanatory variables which are information items which can influence the supply amount of a product; determining components to be used for prediction of the supply amount, among the components optimized, based on the gating function optimized and the data for prediction; and predicting the supply amount, based on the determined components and the data for prediction.

A ninth exemplary aspect is a non-transitory tangible recording medium having recorded thereon a hierarchical latent variable model for predicting a supply amount of a product, the recording medium having recorded thereon optimized components and optimized gating function obtained by: inputting data for study which is a plurality of combinations of a response variable which is a known supply amount of a product and one or more explanatory variables which are information items which can influence the supply amount; setting a hierarchical latent structure that is a structure in which latent variables are represented by a tree structure and components representing probability models are located at nodes of a lowest level of the tree structure; computing a variational probability of a path latent variable that is a latent variable included in a path linking a root node to a target node in the hierarchical latent structure, based on the input data for study and the components; optimizing each of the components for the computed variational probability, based on the input data for study; and optimizing a gating function model that is a model for determining a branch direction according to the explanatory variables in a node of the hierarchical latent structure, based on the variational probability of the latent variable in the node.

According to the exemplary aspects, it is possible to automate classification of the prediction models and to perform supply amount prediction using the appropriate prediction models.

BRIEF DESCRIPTION OF THE DRAWINGS

FIG. 1 is a block diagram showing a structure example of a supply amount prediction system according to at least one exemplary embodiment.

FIGS. 2A to 2G are diagrams showing examples of information to be stored in a learning database according to at least one exemplary embodiment.

DETAILED DESCRIPTION

Figure 3:
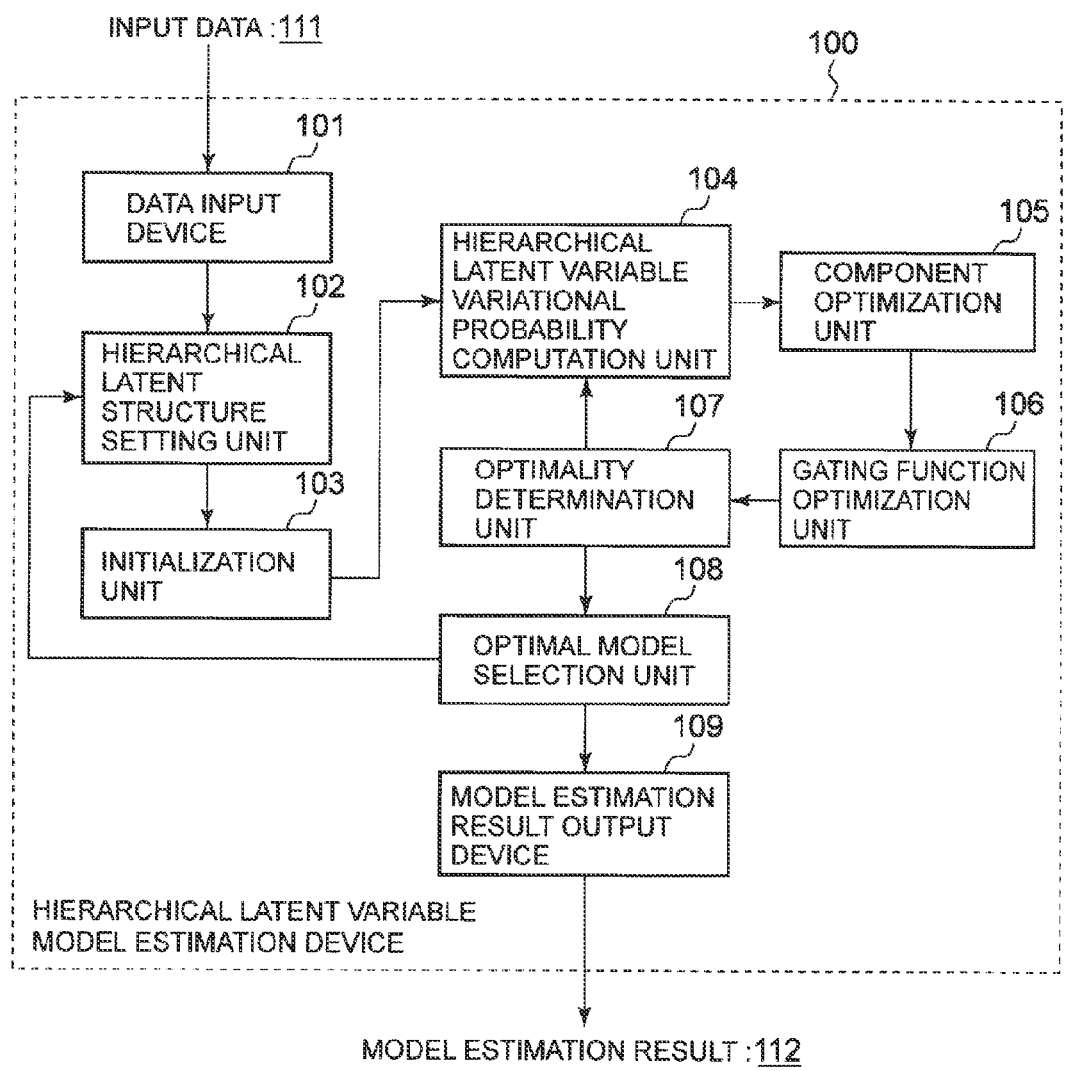
FIG. 3 is a block diagram showing a structure example of a hierarchical latent variable model estimation device according to at least one exemplary embodiment.

In the present specification, a hierarchical latent variable model is a model in which latent variables (i.e. hierarchical structure) have a tree structure. Components which are probability models are located at lowest-level nodes of the tree structure. Each branch node is provided with a gating function for sorting branches according to input. In the following description, the hierarchical latent variable model of depth 2 in particular is described in detail.

Since the hierarchical structure is assumed to be the tree structure, a course from a root node to a given node is uniquely determined. Hereafter, the course (link) when linking the root node to the given node in the hierarchical latent structure is referred to as a path. By tracing a latent variable for each path, a path latent variable is determined. For example, a lowest-level path latent variable indicates a path latent variable determined for each path from the root node to a lowest-level node.

In the following description, it is assumed that a data sequence ($n=1, \ldots, N$) is input, where $x^n$ is an M-dimensional multivariate data sequence ($x^n = x_1^n, \ldots, x_M^n$). The data sequence $x^n$ is also referred to as an observed variable. A first-level branch latent variable $z_i^n$, a lowest-level branch latent variable $z_{j|i}^n$, and a lowest-level path latent variable $z_{ij}^n$ for the observed variable $x^n$ are defined.

$z_i^n = 1$ indicates that $x^n$ input to the root node branches to the first-level i-th node, and $z_i^n = 0$ indicates that $x^n$ input to the root node does not branch to the first-level i-th node. $z_{j|i}^n = 1$ indicates that $x^n$ input to the first-level i-th node branches to the second-level j-th node, and $z_{j|i}^n = 0$ indicates that $x^n$ input to the first-level i-th node does not branch to the second-level j-th node. $z_{ij}^n = 1$ indicates that $x^n$ corresponds to the component traced by passing through the first-level i-th node a 5 nd the second-level j-th node, and $z_{ij}^n = 0$ indicates that $x^n$ does not correspond to the component traced by passing through the first-level i-th node and the second-level j-th node.

Since $\Sigma_i z_i^n = 1$, $\Sigma_j z_{j|i}^n = 1$, and $z_{ij}^n = z_i^n \cdot z_{j|i}^n$ are satisfied, $z_i^n = \Sigma_j z_{ij}^n$ holds true. The combination of x and z which is a representative value of the lowest-level path latent variable zijn is referred to as a "complete variable". In contrast, x is referred to as an "incomplete variable".

A hierarchical latent variable model joint distribution of depth 2 for the complete variable is represented by the following Expression 1.

$$p(x^N, z^N | M) = p(x^N, z^N_{1st}, z^N_{2nd} | M)$$
$$= \int \prod_{n=1}^{N} \left\{ p(z^n_{1st} | \beta) \prod_{i=1}^{K_1} p(z^n_{2nd|i} | \beta_i)^{z^n_i} \prod_{i=1}^{K_1} \prod_{j=1}^{K_2} p(x^n | \phi_{ij})^{z^n_i \cdot z^n_{j|i}} \right\} d\theta$$

(Expression 1)

That is, the hierarchical latent variable model joint distribution of depth 2 for the complete variable is defined by P(x, y)=P(x, $z_{1st}$, $z_{2nd}$) included in Expression 1 shown above. Here, a representative value of $z_i^n$ is denoted by $z_{1st}^n$, and a representative value of $z_{j|i}^n$ is denoted by $z_{2nd}^n$. Moreover, a variational distribution for the first-level branch latent variable $z_i^n$ is denoted by $q(z_i^n)$, and a variational distribution for the lowest-level path latent variable $z_{ij}^n$ is denoted by $q(z_{ij}^n)$.

In Expression 1 shown above, $K_1$ denotes the number of nodes of the first level, and $K_2$ denotes the number of nodes branched from each of the nodes of the first level.

The components 5 of the lowest level are represented by $K_1 \cdot K_2$. Meanwhile, $\theta=(\beta, \beta 1, \ldots, \beta K_1, \phi 1, \ldots, \phi K_1 \cdot K_2)$ denotes the parameter of the model. Here, $\beta$ is a branch parameter of the root node, $\beta k$ is a branch parameter of a first-level k-th node, and $\phi k$ is an observation parameter for a k-th component.

Furthermore, S1, . . . , $SK_1 \cdot K_2$ represents the type of observation probability corresponding to $\phi k$. As an example, in the case of multivariate data generation probability, candidates that can be S1 to $SK_1 \cdot K_2$ are {normal distribution, lognormal distribution, exponential distribution} and the like. As another example, in the case of outputting a polynomial curve, candidates that can be S1 to $SK_1 \cdot K_2$ are {zero-degree curve, linear curve, quadratic curve, cubic curve} and the like.

In the following description, a hierarchical latent variable model of depth 2 is used as a specific example. Note, however, that the hierarchical latent variable model according to the at least one exemplary embodiment is not limited to a hierarchical latent variable model of depth 2, and may be a hierarchical latent variable model of depth 1 or depth 3 or more. In these cases, too, Expression 1 shown above and Expressions 2 to 4 shown below can be derived as in the case of the hierarchical latent variable model of depth 2, and so the estimation device can be realized by the same structure.

Though the following describes a distribution in the case where a target variable is X, the case where an observation distribution is a conditional model P(Y|X) (Y is a target random variable) as in regression or discrimination is applicable.

An essential difference between the estimation device according to the exemplary embodiment and the estimation method for the mixture latent variable model described in Factorized Asymptotic Bayesian Inference for Mixture Modeling and PCT International Publication No. WO 2012/128207 is described below, before describing the exemplary embodiment.

In the method described in Factorized Asymptotic Bayesian Inference for Mixture Modeling and PCT International Publication No. WO 2012/128207, a typical mixture model in which a latent variable is an indicator of each component is assumed, and an optimization criterion is derived as in Expression 10 in Factorized Asymptotic Bayesian Inference for Mixture Modeling and PCT International Publication No. WO 2012/128207. However, as Fisher information matrices are given in the form of Expression 6 in Factorized Asymptotic Bayesian Inference for Mixture Modeling and PCT International Publication No. WO 2012/128207, it is assumed in the method described in Factorized Asymptotic Bayesian Inference for Mixture Modeling and PCT International Publication No. WO 2012/128207 that a probability distribution of the latent variable, which is the indicator of each component, depends only on a mixture ratio of the mixture model. Therefore, component switching according to input cannot be realized, and so this optimization criterion is inappropriate.

In order to solve the problem stated above, it is necessary to set hierarchical latent variables and perform computation using an appropriate optimization criterion, as described in the following exemplary embodiments. In the following exemplary embodiments, a multi-stage specific model for sorting branches at each branch node according to input is assumed as an appropriate optimization criterion.

The following describes the exemplary embodiments with reference to drawings.

Exemplary Embodiment 1

FIG. 1 is a block diagram showing a structure example of a supply amount prediction system according to at least one exemplary embodiment. A supply amount prediction system 10 according to the exemplary embodiment includes a hierarchical latent variable model estimation device 100, a learning database 300, a model database 500, and a supply amount prediction device 700. The supply amount prediction system 10 generates models to be used for prediction of a supply amount based on the information according to the past supply of the product, and performs estimation of the supply amount using the models.

Using the data stored in the learning database 300, the hierarchical latent variable model estimation device 100 estimates models for predicting the supply amount of the product, and stores the model in the model database 500.

FIGS. 2A to 2G are diagrams showing examples of information stored in the learning database 300 according to at least one exemplary embodiment.

The learning database 300 records data related to the product and a store.

In detail, the learning database 300 stores a supply table storing data related to supply of the product. As shown in FIG. 2A, the supply table stores sales, a unit price, subtotal, a receipt number, in association with combination of date and time, a product ID, a store ID, and a customer ID. The customer ID is information for uniquely identifying customers, and is specified by presentation of a membership card or a point card, for example.

In addition, the learning database 300 stores a weather table for storing data related to the weather. As shown in FIG. 2B, in association with the date and time, the weather table stores a temperature, a maximum temperature of the day, a minimum temperature of the day, precipitation, weather, a discomfort index, and the like.

In addition, the learning database 300 stores a customer table for storing data related to customers who purchased the products. As shown in FIG. 2C, the customer table stores an age, an address, family members, and the like, in association with the customer ID. In the exemplary embodiment, the information items are stored at the time of registration of a membership card or a point card.

The learning database 300 stores a stock table for storing data related to stock quantity of the products. As shown in FIG. 2D, the stock table stores stock quantity, an increased or decreased value from the previous stock quantity, in association with the combination of the date and time, and the product ID.

The learning database 300 stores a store attribution table for storing data related to a store. As shown in FIG. 2E, the store attribution table includes a store name, an address, a type, a space, and number of parking spaces, in association with the store ID. Examples of the type of the store include a station type which is located in front of a station, a residential area type which is located in residential area, and a composite type which is a complex with the other facility such as a gas station.

In addition, the learning database 300 stores a date attribution table for storing data related to the date. As shown in FIG. 2F, in association with the date, the date attribution table includes an information type showing the attribution of the date, and a value, the product ID, and the store ID. Examples of the information type includes a public holiday, a dates of a promotional sale, an event held near the store, and the like. The value of the date attribution table is 1 or 0. In a case where the value of the date attribution table is 1, the attribution of the date associated with the value includes the attribution which is shown by information type associated with the value. In a case where the value thereof is 0, the attribution of the date associated with the value does not include the attribution which is shown by information type associated with the value. the value shows that the date associated with the value does not have attribution that the information type associated with the value shows. In addition, the product ID and the store ID may be essential or not depending on the information type. For example, in a case where the information type shows a promotion, it is necessary to show which product was in the promotion and in which store, and thus the product ID and the store ID are essential items. On the other hand, in a case where the information type shows a public holiday, the fact that the day is a public holiday is not related with the types of the store and the product, and thus the product ID and the store ID are not essential items.

In addition, the learning database 300 stores a product attribution table for storing data related to the product. As shown in FIG. 2G the product attribution table includes a product name, large classification of a product, middle classification thereof, small classification thereof, a unit price, a cost price, and the like, in association with the product ID.

The model database 500 stores models for predicting the supply amount of the product estimated by the hierarchical latent variable model estimation device. The model database 500 is configured by a non-transitory tangible medium such as a hard disk drive or a solid-state drive.

The supply amount prediction device 700 receives the data related to the products and the store and predicts the supply amount of the product, based on the data and the model stored in the model database 500.

FIG. 3 is a block diagram showing a structure example of the hierarchical latent variable model estimation device according to at least one exemplary embodiment. The hierarchical latent variable model estimation device 100 in this exemplary embodiment includes a data input device 101, a hierarchical latent structure setting unit 102, an initialization unit 103, a hierarchical latent variable variational probability computation unit 104, a component optimization unit 105, a gating function optimization unit 106, an optimality determination unit 107, an optimal model selection unit 108, and a model estimation result output device 109.

The hierarchical latent variable model estimation device 100, upon input of input data 111 generated based on the data stored in the learning database 300, optimizes the hierarchical latent structure and the type of observation probability for the input data 111, outputs the result of optimization as a model estimation result 112, and stores the result in the model database 500. The input data 111 in the exemplary embodiment is an example of the data for study.

Figure 4:
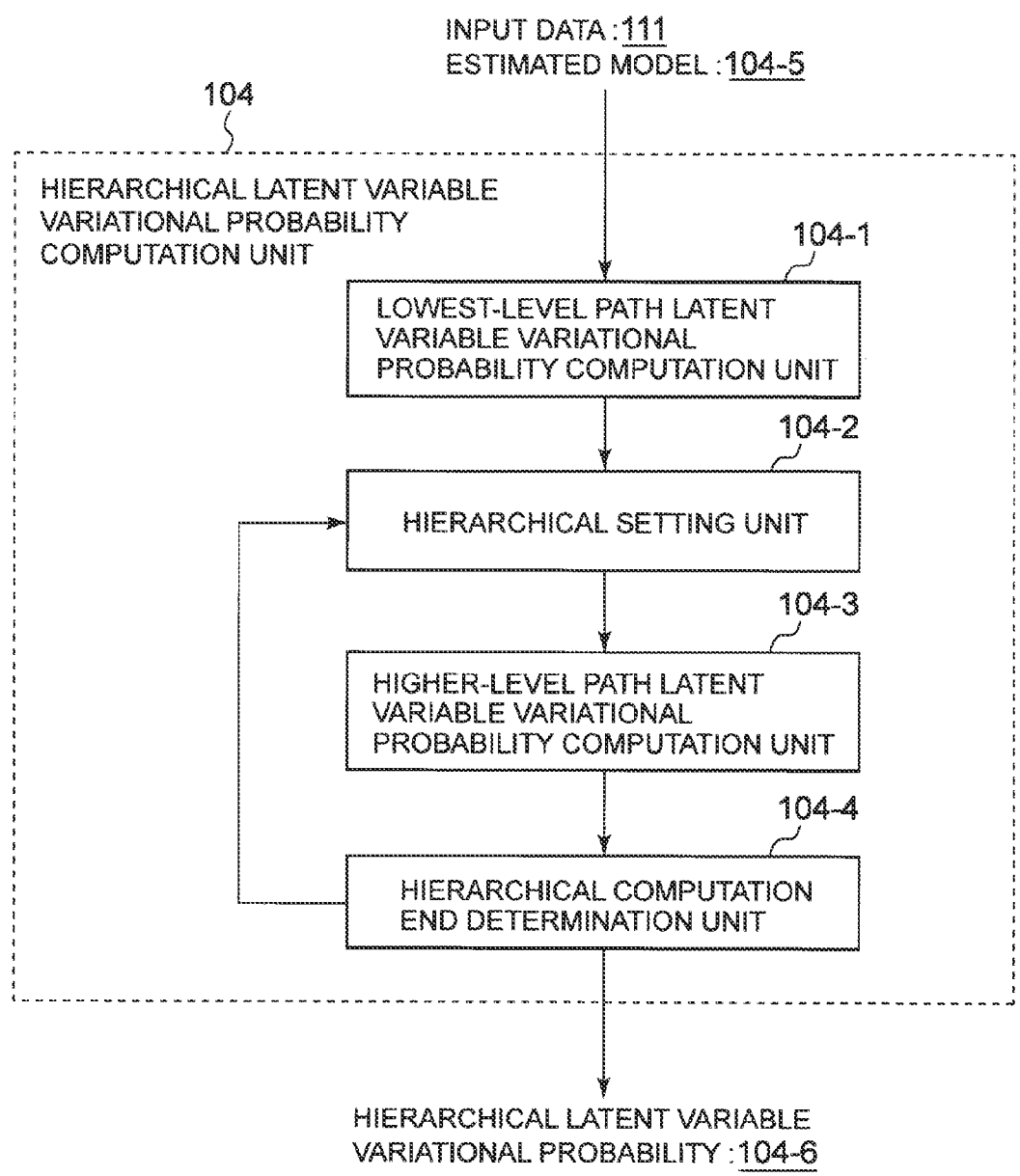
FIG. 4 is a block diagram showing a structure example of a hierarchical latent variable variational probability computation unit according to at least one exemplary embodiment.

FIG. 4 is a block diagram showing a structure example of the hierarchical latent variable variational probability computation unit 104 according to at least one exemplary embodiment. The hierarchical latent variable variational probability computation unit 104 includes a lowest-level path latent variable variational probability computation unit 104-1, a hierarchical setting unit 104-2, a higher-level path latent variable variational probability computation unit 104-3, and a hierarchical computation end determination unit 104-4.

The hierarchical latent variable variational probability computation unit 104 outputs a hierarchical latent variable variational probability 104-6, upon input of the input data 111 and a model 104-5 estimated by the below-mentioned component optimization unit 105. The hierarchical latent variable variational probability computation unit 104 will be described in detail later. The component in the exemplary embodiment is weight according to each explanatory variable. The supply amount prediction device 700 can obtain response variables by computing a total of the explanatory variables obtained by multiplying weight shown by the component.

Figure 5:
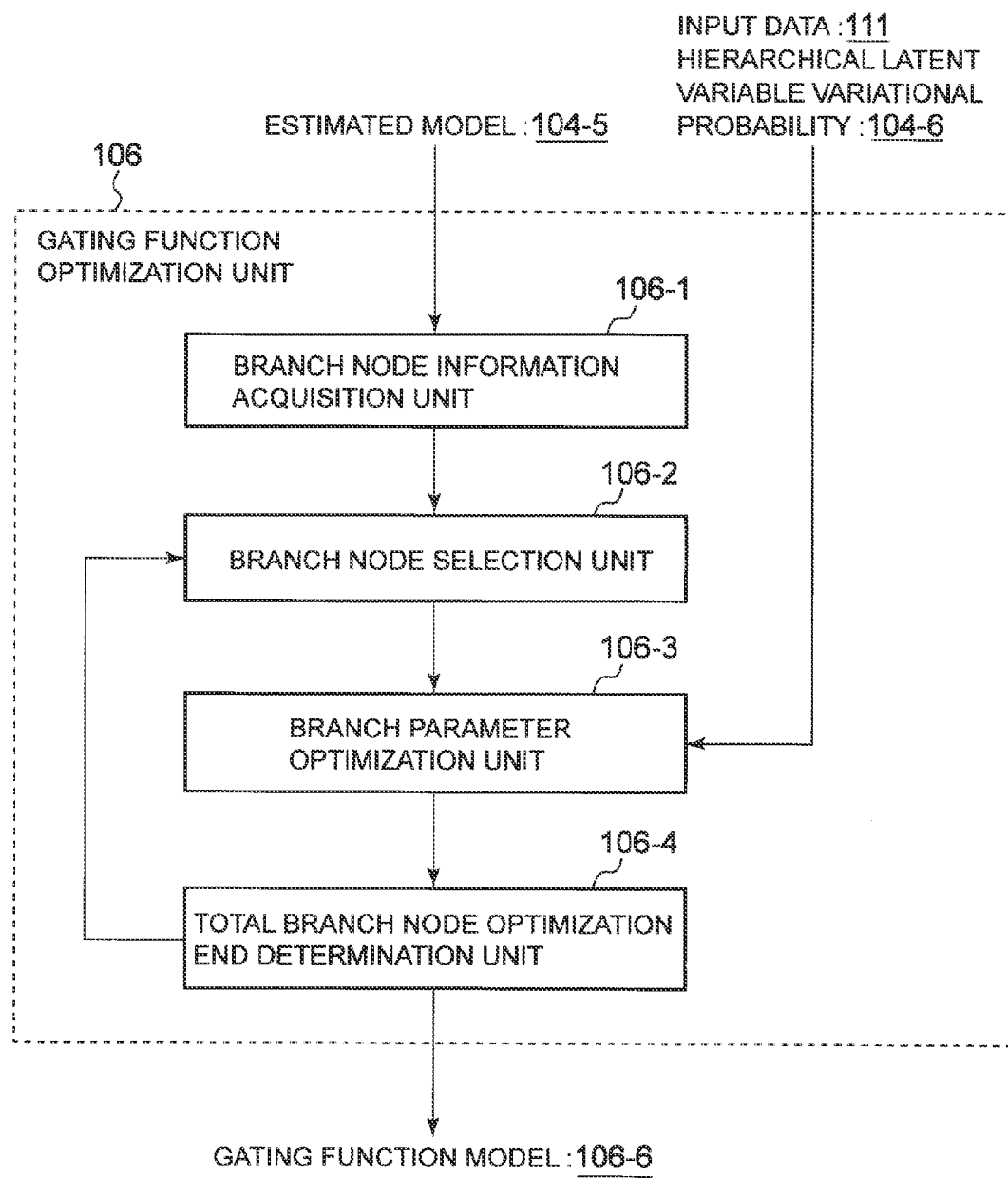
FIG. 5 is a block diagram showing a structure example of a gating function optimization unit according to at least one exemplary embodiment.

FIG. 5 is a block diagram showing a structure example of the gating function optimization unit 106 according to at least one exemplary embodiment. The gating function optimization unit 106 includes a branch node information acquisition unit 106-1, a branch node selection unit 106-2, a branch parameter optimization unit 106-3, and a total branch node optimization end determination unit 106-4.

The gating function optimization unit 106 outputs a gating function model 106-6, upon input of the input data 111, the hierarchical latent variable variational probability 104-6 computed by the below-mentioned hierarchical latent variable variational probability computation unit 104, and the model 104-5 estimated by the component optimization unit 105. The gating function optimization unit 106 will be described in detail later. The gating function of the exemplary embodiment is a function for determining whether or not the information included in the input data 111 satisfies predetermined conditions. In addition, the gating function is provided corresponding to an internal node of the hierarchical latent structure. The supply amount prediction device 700 determines a next node to follow, according to the determined result of the gating function, at the time of following the node of the hierarchical latent structure.

The data input device 101 is a device for inputting the input data 111. The data input device 101 generates response variables showing the known supply amount of the product for each predetermined time range (for example, 1 hour or 6 hours), based on the data stored in the supply table of the learning database 300. As the response variables, the sales for each predetermined time range of a single product in a single store, the sales for each predetermined time range of one product in all stores, sales price for each predetermined time range of all products in one store, and the like can be employed, for example. In addition, the data input device 101 generates one or more explanatory variables which is information which can influence the response variables, for each response variable, based on the data stored in the weather table, the customer table, the stores attribution table, the date attribution table, and the product attribution table of the learning database 300. The data input device 101 inputs a plurality of combinations of the response variable and the explanatory variable as the input data 111. When inputting the input data 111, the data input device 101 simultaneously inputs parameters necessary for model estimation, such as candidates for the type of observation probability and the number of components. In the exemplary embodiment, the data input device 101 is an example of the study data input unit.

The hierarchical latent structure setting unit 102 selects and sets a structure of a hierarchical latent variable model as an optimization candidate, from the input candidates for the type of observation probability and the number of components. The latent structure used in the exemplary embodiment is a tree structure. Hereafter, the set number of components is denoted by C, and the mathematical expressions used in the description relate to a hierarchical latent variable model of depth 2. Note that the hierarchical latent structure setting unit 102 may store the selected hierarchical latent variable model structure in an internal memory.

For example, in the case of a binary tree model (model in which each branch node has two branches) of a 10 tree structure of depth 2, the hierarchical latent structure setting unit 102 selects a hierarchical latent structure having two first-level nodes and four second-level nodes (lowest-level nodes in this exemplary embodiment).

The initialization unit 103 performs an initialization process for estimating the hierarchical latent variable model. The initialization unit 103 is capable of executing the initialization process by an arbitrary method. For example, the initialization unit 103 may randomly set the type of observation probability for each component, and randomly set a parameter of each observation probability according to the set type. Moreover, the initialization unit 103 may randomly set a lowest-level path variational probability of a hierarchical latent variable.

The hierarchical latent variable variational probability computation unit 104 computes a variational probability of a path latent variable for each level. Here, the parameter θ has been computed by the initialization unit 103 or by the component optimization unit 105 and the gating function optimization unit 106. Accordingly, the hierarchical latent variable variational probability computation unit 104 computes the variational probability using the parameter θ.

The hierarchical latent variable variational probability computation unit 104 computes the variational probability, by Laplace-approximating a marginal log-likelihood function with respect to an estimate (e.g. a maximum likelihood estimate or a maximum a posteriori probability estimate) for the complete variable and maximizing its lower bound. Such computed value is hereafter referred to as an optimization criterion A.

A procedure of computing the optimization criterion A is described below, using a hierarchical latent variable model of depth 2 as an example. A marginal log-likelihood is given by the following Expression 2.

$$\log p(x^N | M) \geq \sum_{z^N} q(z^N) \log \left\{ \frac{p(x^N, z^N | M)}{q(z^N)} \right\} \quad \text{(Expression 2)}$$

First, consider the lower bound of the marginal log-likelihood given by Expression 2 shown above. In Expression 2, the equality holds true when the lowest-level path latent variable variational probability $q(z^N)$ is maximized. Laplace-approximating the marginal likelihood of the complete variable in the numerator using the maximum likelihood estimate for the complete variable yields an approximation of the marginal log-likelihood function represented by the following Expression 3.

$$\mathcal{J}(q, \overline{\theta}, x^N) = \sum_{z^N} q(z^N) \left\{ \log p(x^N, z^N | \overline{\theta}) - \frac{D_\beta}{2} \log N - \sum_{i=1}^{K_1} \frac{D_{\beta_i}}{2} \log \left( \sum_{n=1}^{N} \sum_{j=1}^{K_2} z_{ij}^n \right) - \sum_{i=1}^{K_1} \sum_{j=1}^{K_2} \frac{D_{\phi_{ij}}}{2} \log \left( \sum_{n=1}^{N} z_{ij}^n \right) - \log q(z^N) \right\} \quad \text{(Expression 3)}$$

In Expression 3, the superscript bar indicates the maximum likelihood estimate for the complete variable, and D* indicates the dimensionality of the subscript parameter Next, by use of the property of the maximum likelihood estimate to maximize the log-likelihood function and the fact that the logarithm function is a concave function, the lower bound of Expression 3 is computed according to the following Expression 4.

$$\mathcal{G}(q, q', q'', \theta, x^N) = \sum_{z^N} q(z^N) \left[ \log p(x^N, z^N | \overline{\theta}) - \frac{D_\beta}{2} \log N - \sum_{i=1}^{K_1} \frac{D_{\beta_i}}{2} \left\{ \log \left( \sum_{n=1}^{N} q'(z_i^n) \right) + \frac{\sum_{n=1}^{N} \sum_{j=1}^{K_2} z_{ij}^n}{\sum_{n=1}^{N} q'(z_i^n)} - 1 \right\} - \sum_{i=1}^{K_1} \sum_{j=1}^{K_2} \frac{D_{\phi_{ij}}}{2} \left\{ \log \left( \sum_{n=1}^{N} q''(z_{ij}^n) \right) + \frac{\sum_{n=1}^{N} z_{ij}^n}{\sum_{n=1}^{N} q''(z_{ij}^n)} - 1 \right\} - \log q(z^N) \right] \quad \text{(Expression 4)}$$

A variational distribution q' of the first-level branch latent variable and a variational distribution q'' of the lowest-level path latent variable are each obtained by maximizing Expression 4 for the variational distribution. Here, q'' and θ are fixed so that $q'' = q''^{(t-1)}$ and $\theta = \theta^{(t-1)}$, and q' is fixed at the value represented by the following Expression A.

$$q' = \sum_{j=1}^{K_2} q''^{(t-1)} \quad \text{(Expression A)}$$

Here, the superscript (t) indicates the t-th iteration in iterative computation of the hierarchical latent variable variational probability computation unit 104, the component optimization unit 105, the gating function optimization unit 106, and the optimality determination unit 107.

The following describes the operation of the hierarchical latent variable variational probability computation unit 104 with reference to FIG. 4.

The lowest-level path latent variable variational probability computation unit 104-1 receives input of the input data 111 and the estimated model 104-5, and computes the lowest-level latent variable variational probability $q(z^N)$. The hierarchical setting unit 104-2 sets the lowest level as the variational probability computation target. In detail, the lowest-level path latent variable variational probability computation unit 104-1 computes variational probability of each estimated model 104-5, for each combination of the response variable and the explanatory variable of the input data 111. The computation of the variational probability is performed by comparing a solution obtained by substituting the explanatory variable of the input data 111 in the estimated model 104-5 and the response variable of the input data 111.

The higher-level path latent variable variational probability computation unit 104-3 computes the path latent variable variational probability of the immediately higher level. In detail, the higher-level path latent variable variational probability computation unit 104-3 computes the sum of latent variable variational probabilities of the current level having the same branch node as the parent, and sets the sum as the path latent variable variational probability of the immediately higher level.

The hierarchical computation end determination unit 104-4 determines whether or not there is any higher level for which the variational probability is to be computed. In the case where the hierarchical computation end determination unit 104-4 determines that there is a higher level, the hierarchical setting unit 104-2 sets the immediately higher level as the variational probability computation target. Subsequently, the higher-level path 10 latent variable variational probability computation unit 104-3 and the hierarchical computation end determination unit 104-4 repeat the above-mentioned process. In the case where the hierarchical computation end determination unit 104-4 determines that there is no higher level, the hierarchical computation end determination unit 104-4 determines that the path latent variable variational probability has been computed for all levels.

The component optimization unit 105 optimizes the model (parameter θ and type S) of each component for Expression 4 shown above, and outputs the optimized model 104-5. In the case of a hierarchical latent variable model of depth 2, the component optimization unit 105 fixes q and q" at the lowest-level path latent variable variational probability $q^{(1)}$ computed by the hierarchical latent variable variational probability computation unit 104, and fixes q' at the higher-level path latent variable variational probability represented by Expression A shown above. The component optimization unit 105 then computes a model for maximizing the value of G in Expression 4.

G defined by Expression 4 can decompose the optimization function for each component. Accordingly, S1 to $SK_1 \cdot K_2$ and parameters φ1 to $φK_1 \cdot K_2$ can be separately optimized without taking into account the component type combination (e.g. which type of S1 to $SK_1 \cdot K_2$ is designated). The capability of optimizing in such a way is important in this process. Thus, the type of component can be optimized while avoiding combination explosion.

The following describes the operation of the gating function optimization unit 106 with reference to FIG. 5. The branch node information acquisition unit 106-1 extracts a branch node list using the model 104-5 estimated by the component optimization unit 105. The branch node selection unit 106-2 selects one branch node from the extracted branch node list. Hereafter, the selected node is also referred to as a selection node.

The branch parameter optimization unit 106-3 optimizes the branch parameter of the selection node, using the input data 111 and the latent variable variational probability for the selection node obtained from the hierarchical latent variable variational probability 104-6. The branch parameter of the selection node corresponds to the above-mentioned gating function.

The total branch node optimization end determination unit 106-4 determines whether or not all branch nodes extracted by the branch node information acquisition unit 106-1 have been optimized. In the case where all branch nodes have been optimized, the gating function optimization unit 106 ends the process. In the case where all branch nodes have not been optimized, the branch node selection unit 106-2 performs its process, and then the branch parameter optimization unit 106-3 and the total branch node optimization end determination unit 106-4 perform their respective processes.

A specific example of the gating function is described below, using a gating function based on a Bernoulli distribution for a binary tree hierarchical model. Hereafter, the gating function based on the Bernoulli distribution is also referred to as a Bernoulli gating function. Let $x_d$ be the d-th dimension of x, $g^-$ be a probability of branching to the lower left of the binary tree when this value does not exceed a threshold w, and $g^-$ be a probability of branching to the lower left of the binary tree when this value exceeds the threshold w. The branch parameter optimization unit 106-3 optimizes the above-mentioned optimization parameters d, w, $g^-$, and $g^+$, based on the Bernoulli distribution.

The optimality determination unit 107 determines whether or not the optimization criterion A computed using Expression 4 shown above has converged. In the case where the optimization criterion A has not converged, the processes by the hierarchical latent variable variational probability computation unit 104, the component optimization unit 105, the gating function optimization unit 106, and the optimality determination unit 107 are repeated. For example, the optimality determination unit 107 may determine that the optimization criterion A has converged in the case where an increment of the optimization criterion A is less than a predetermined threshold.

Hereafter, the processes by the hierarchical latent variable variational probability computation unit 104, the component optimization unit 105, the gating function optimization unit 106, and the optimality determination unit 107 are also collectively referred to as the processes by the hierarchical latent variable variational probability computation unit 104 to the optimality determination unit 107. The processes by the hierarchical latent variable variational probability computation unit 104 to the optimality determination unit 107 are repeatedly performed to update the variational distribution and the model, as a result of which an appropriate model can be selected. Note that repeatedly performing these processes ensures that the optimization criterion A increases monotonically.

The optimal model selection unit 108 selects an optimal model. In detail, in the case where the optimization criterion A computed as a result of the processes by the hierarchical latent variable variational probability computation unit 104 to the optimality determination unit 107 is greater than the currently set optimization criterion A for the number C of hidden states set by the hierarchical latent structure setting unit 102, the optimal model selection unit 108 selects the model as the optimal model.

The model estimation result output device 109 outputs the optimal number of hidden states, type of observation probability, parameter, variational distribution, and the like as the model estimation result output result 112, in the case where model optimization has been completed for the candidate of the hierarchical latent variable model structure set from the input candidates for the type of observation probability and the number of components. In the case where there is any candidate for which optimization has not been completed, on the other hand, the procedure goes to the process by the hierarchical latent structure setting unit 102, and the same processes as described above are performed.

The hierarchical latent structure setting unit 102, the initialization unit 103, the hierarchical latent variable variational probability computation unit 104 (more specifically, the lowest-level path latent variable variational probability computation unit 104-1, the hierarchical setting unit 104-2, the higher-level path latent variable variational probability computation unit 104-3, and the hierarchical computation end determination unit 104-4), the component optimization unit 105, the gating function optimization unit 106 (more specifically, the branch node information acquisition unit 106-1, the branch node selection unit 106-2, the branch parameter optimization unit 106-3, and the total branch node optimization end determination unit 106-4), the optimality determination unit 107, and the optimal model selection unit 108 are realized by a CPU of a computer operating according to a program (hierarchical latent variable model estimation program).

For example, the program may be stored in a storage unit (not shown) in the hierarchical latent variable model estimation device 100, with the CPU reading the program and, according to the program, operating as the hierarchical latent structure setting unit 102, the initialization unit 103, the hierarchical latent variable variational probability computation unit 104 (more specifically, the lowest-level path latent variable variational probability computation unit 104-1, the hierarchical setting unit 104-2, the higher-level path latent variable variational probability computation unit 104-3, and the hierarchical computation end determination unit 104-4), the component optimization unit 105, the gating function optimization unit 106 (more specifically, the branch node information acquisition unit 106-1, the branch node selection unit 106-2, the branch parameter optimization unit 106-3, and the total branch node optimization end determination unit 106-4), the optimality determination unit 107, and the optimal model selection unit 108.

Alternatively, the hierarchical latent structure setting unit 102, the initialization unit 103, the hierarchical latent variable variational probability computation unit 104, the component optimization unit 105, the gating function optimization unit 106, the optimality determination unit 107, and the optimal model selection unit 108 may each be realized by dedicated hardware.

Figure 6:
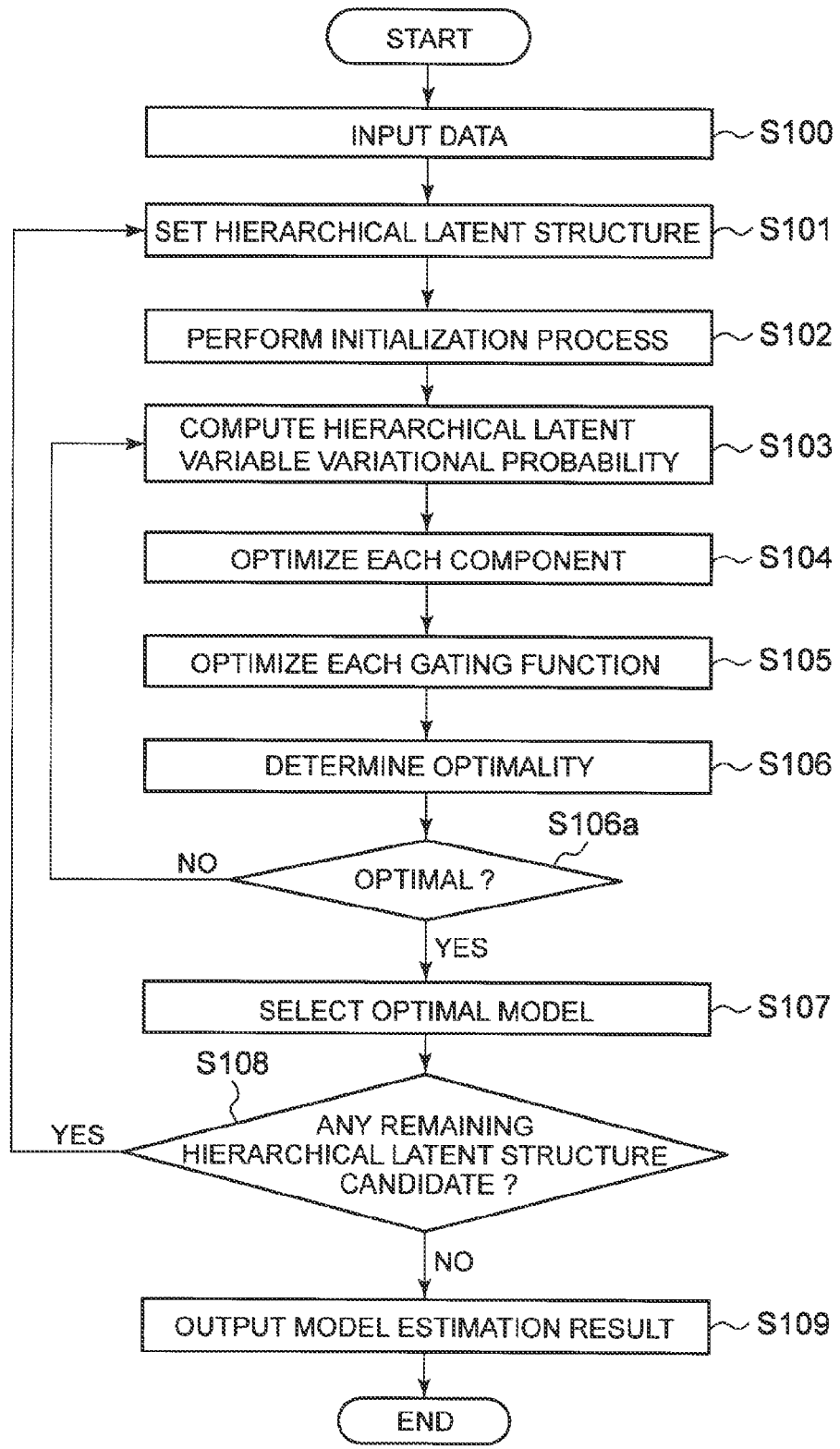
FIG. 6 is a flowchart showing an operation example of the hierarchical latent variable model estimation device according to at least one exemplary embodiment.

The following describes the operation of the hierarchical latent variable model estimation device in this exemplary embodiment. FIG. 6 is a flowchart showing an operation example of the hierarchical latent variable model estimation device according to at least one exemplary embodiment.

First, the data input device 101 inputs the input data 111 (step S100). Next, the hierarchical latent structure setting unit 102 selects and sets a hierarchical latent structure which has not been optimized, from the input hierarchical latent structure candidate values (step S101). Next, the initialization unit 103 performs the initialization process of the latent variable variational probability and the parameter used for estimation, for the set hierarchical latent structure (step S102).

Next, the hierarchical latent variable variational probability computation unit 104 computes the variational probability of each path latent variable (step S103). Next, the component optimization unit 105 optimizes each component by estimating the type of observation probability and the parameter (step S104).

Next, the gating function optimization unit 106 optimizes the branch parameter in each branch node (step S105). Next, the optimality determination unit 107 determines whether or not the optimization criterion A has converged (step S106). That is, the optimality determination unit 107 determines the optimality of the model.

In the case where, in step S106, it is not determined that the optimization criterion A has converged, i.e. it is determined that the model is not optimal (step S106a: No), the processes of steps S103 to S106 are repeated.

In the case where, in step S106, it is determined that the optimization criterion A has converged, i.e. it is determined that the model is optimal (step S106a: Yes), on the other hand, the optimal model selection unit 108 compares the value of the optimization criterion A according to the currently set optimal model (e.g. the number of components, the type of observation probability, the parameter) with the value of the optimization criterion A according to the model optimized in this process, and selects the model with the greater value as the optimal model (step S107).

Next, the optimal model selection unit 108 determines whether or not any hierarchical latent structure candidate which has not been estimated remains (step S108). In the case where the candidate remains (step S108: Yes), the processes of steps S101 to S108 are repeated. In the case where no candidate remains (step S108: No), on the other hand, the model estimation result output device 109 outputs the model estimation result, and ends the process (step S109). That is, the model estimation result output device 109 stores the component optimized by the component optimization unit 105 and the gating function optimized by the gating function optimization unit 106 in the model database 500.

Figure 7:
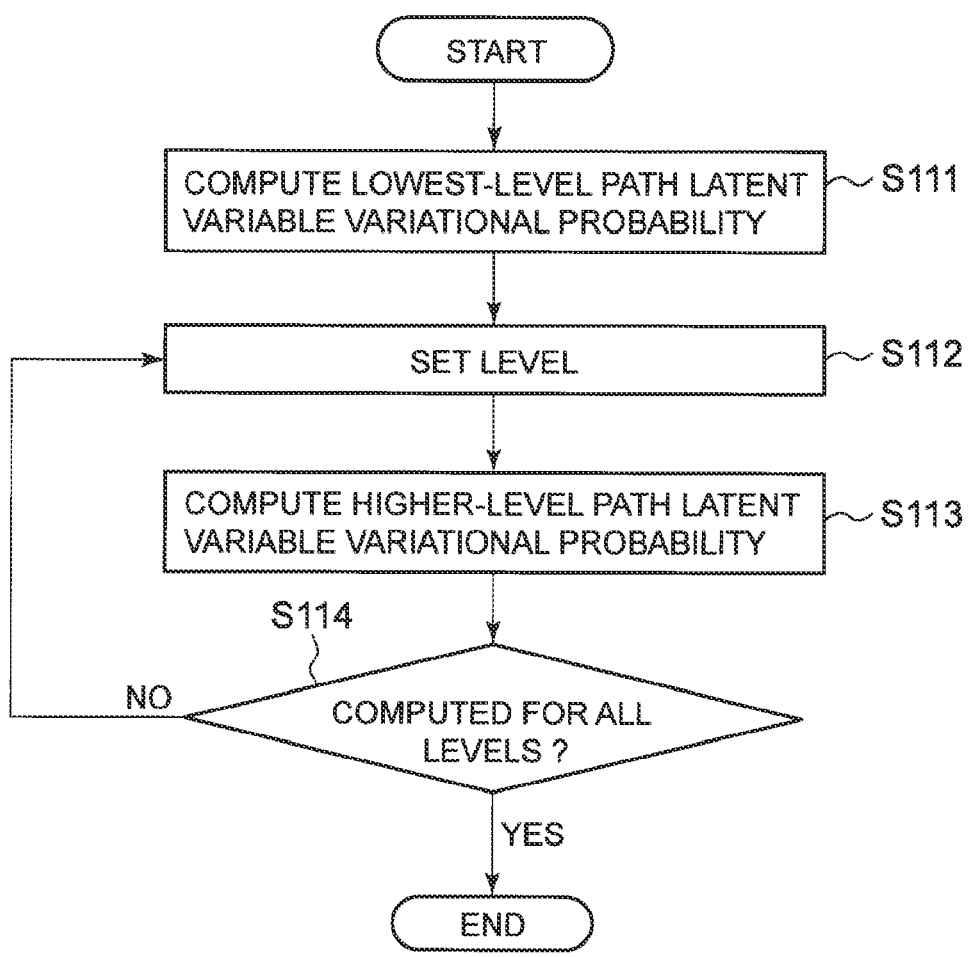
FIG. 7 is a flowchart showing an operation example of the hierarchical latent variable variational probability computation unit according to at least one exemplary embodiment.

The following describes the operation of the hierarchical latent variable variational probability computation unit 104 in this exemplary embodiment. FIG. 7 is a flowchart showing an operation example of the hierarchical latent variable variational probability computation unit 104 according to at least one exemplary embodiment.

First, the lowest-level path latent variable variational probability computation unit 104-1 computes the lowest-level path latent variable variational probability (step S111). Next, the hierarchical setting unit 104-2 sets to the level in which the path latent variable has been computed (step S112). Next, the higher-level path latent variable variational probability computation unit 104-3 computes the path latent variable variational probability of the immediately higher level, using the path latent variable variational probabilities of the level set by the hierarchical setting unit 104-2 (step S113).

Next, the hierarchical computation end determination unit 104-4 determines whether or not any level for which the path latent variable has not been computed remains (step S114). In the case where the level for which the path latent variable has not been computed remains (step S114: No), the processes of steps S112 to S113 are repeated. In the case where no level for which the path latent variable has not been computed remains, on the other hand, the hierarchical latent variable variational probability computation unit 104 ends the process.

Figure 8:
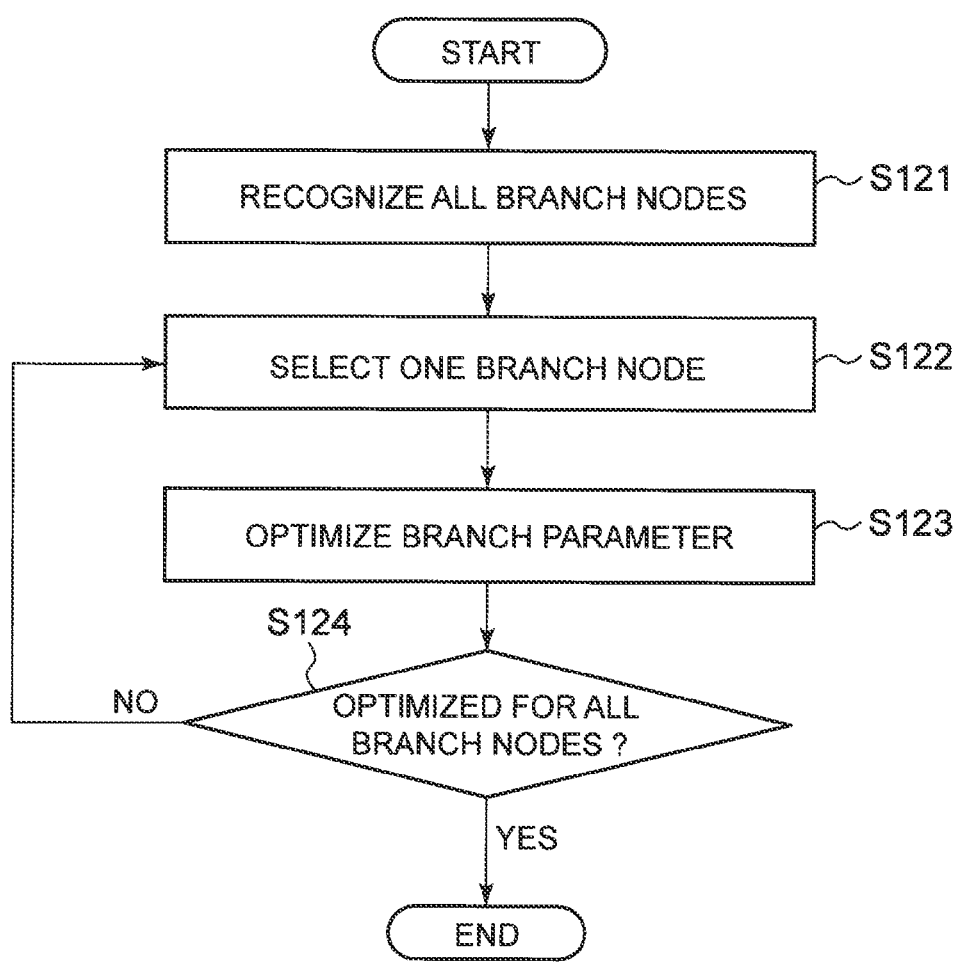
FIG. 8 is a flowchart showing an operation example of the gating function optimization unit according to at least one exemplary embodiment.

The following describes the operation of the gating function optimization unit 106 in this exemplary embodiment. FIG. 8 is a flowchart showing an operation example of the gating function optimization unit 106 according to at least one exemplary embodiment.

First, the branch node information acquisition unit 106-1 recognizes all branch nodes (step S121). Next, the branch node selection unit 106-2 selects one branch node as the optimization target (step S122). Next, the branch parameter optimization unit 106-3 optimizes the branch parameter in the selected branch node (step S123).

Next, the total branch node optimization end determination unit 106-4 determines whether or not any branch node which has not been optimized remains (step S124). In the case where the branch node which has not been optimized remains, the processes of steps S122 to S123 are repeated. In the case where no branch node which has not been optimized remains, on the other hand, the gating function optimization unit 106 ends the process.

As described above, according to this exemplary embodiment, the hierarchical latent structure setting unit 102 sets the hierarchical latent structure. Here, the hierarchical latent structure is a structure in which latent variables are represented by a tree structure, with components representing probability models being located at lowest-level nodes of the tree structure.

The hierarchical latent variable variational probability computation unit 104 computes the variational probability of the path latent variable (that is, optimization criterion A). The hierarchical latent variable variational probability computation unit 104 may compute the variational probability of the latent variable for each level of the tree structure, from the lowest-level node in sequence. For example, the hierarchical latent variable variational probability computation unit 104 may compute the variational probability for maximizing the marginal log-likelihood.

Following this, the component optimization unit 105 optimizes the component for the computed variational probability, and the gating function optimization unit 106 optimizes the gating function model based on the variational probability of the latent variable in the node of the hierarchical latent structure. Note that the gating function model is a model for determining the branch direction according to the multivariate data in the node of the hierarchical latent structure.

Since the hierarchical latent variable model for the multivariate data is estimated by the structure described above, the hierarchical latent variable model including hierarchical latent variables can be estimated with appropriate computational complexity without losing theoretical justification, and also the model selection problem for the hierarchical latent variable model can be solved. In addition, by using the hierarchical latent variable model estimation device 100, it is not necessary to manually set a proper reference for classifying the components.

Here, the hierarchical latent structure setting unit 102 may set the hierarchical latent structure in which the latent variables are represented by a binary tree structure, where the gating function optimization unit 106 optimizes the gating function model based on a Bernoulli distribution, based on the variational probability of the latent variable in the node. In this case, each parameter has an analytical solution, which contributes to faster optimization.

By these processes, the hierarchical latent variable model estimation device 100 can classify the components to patterns of selling well when the temperature is low or when the temperature is high, patterns of selling well in the morning or in the afternoon, and patterns of selling well in the beginning of the week or on weekends.

Figure 9:
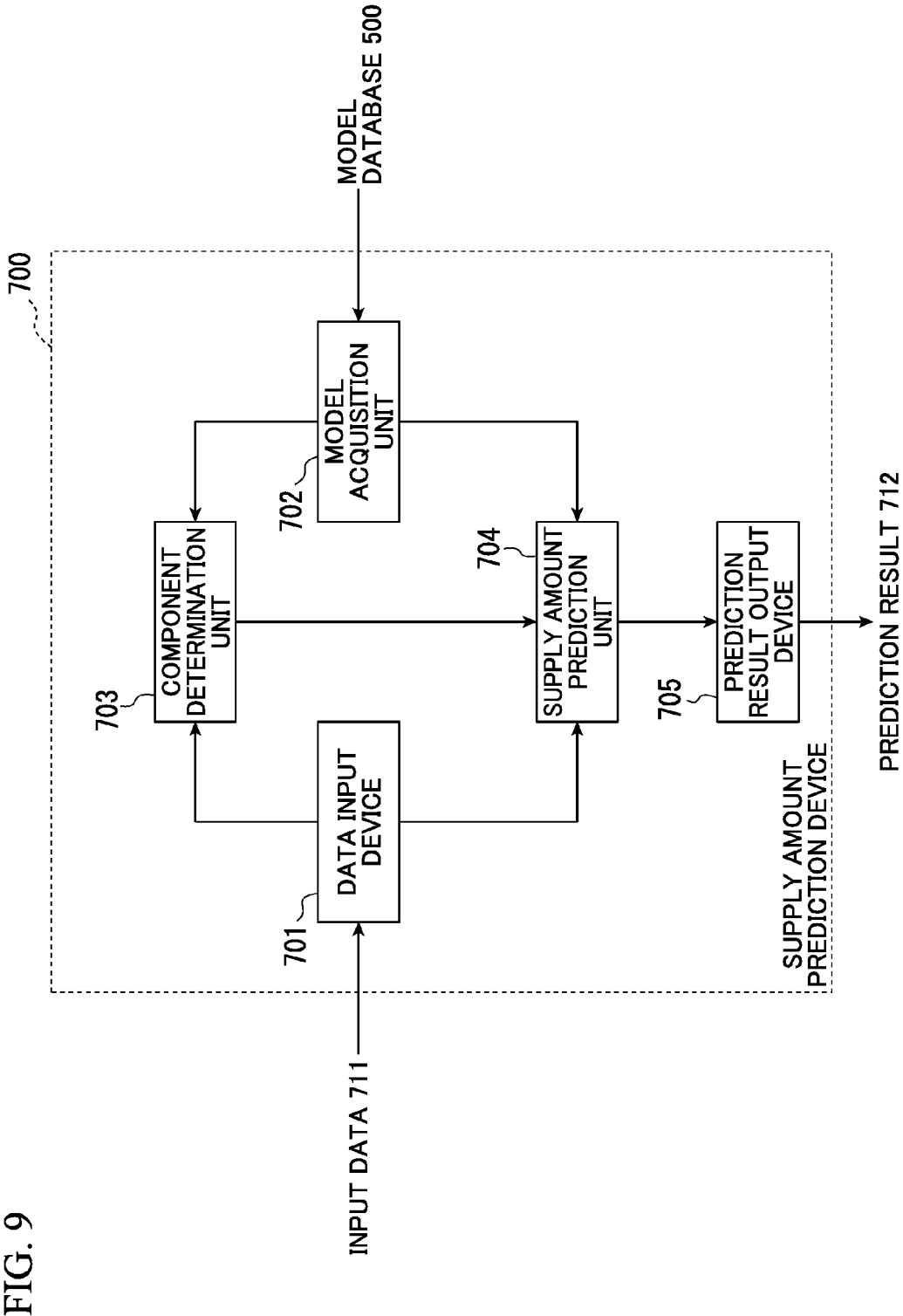
FIG. 9 is a block diagram showing a structure example of the supply amount prediction device according to at least one exemplary embodiment.

The supply amount prediction device of the exemplary embodiment will be described. FIG. 9 is a block diagram showing a structure example of the supply amount prediction device according to at least one exemplary embodiment.

The supply amount prediction device 700 includes a data input device 701, a model acquisition unit 702, a component determination unit 703, a supply amount prediction unit 704, and a prediction result output device 705.

The data input device 701 inputs one or more explanatory variables which is information that can influence the supply amount as input data 711. The types of the explanatory variables configuring the input data 711 are the same types as the explanatory variables of the input data 111. In the exemplary embodiment, the data input device 701 is an example of the prediction data input unit.

The model acquisition unit 702 acquires gating functions or components from the model database 500 as models to be used for prediction of the supply amount. The gating functions are optimized by the gating function optimization unit 106. In addition, the components are optimized by the component optimization unit 105.

The component determination unit 703 follows the hierarchical latent structure, based on the input data 711 input by the data input device 701 and the gating functions acquired by the model acquisition unit 702. The component determination unit 703 determines the components related to nodes of a lowest level of the hierarchical latent structure, to the components to be used for prediction of the supply amount.

The supply amount prediction unit 704 predicts the supply amount by substituting the input data 711 input by the data input device 701 to the component determined by the component determination unit 703.

The prediction result output device 705 outputs a prediction result 712 of the supply amount obtained by the supply amount prediction unit 706.

Figure 10:
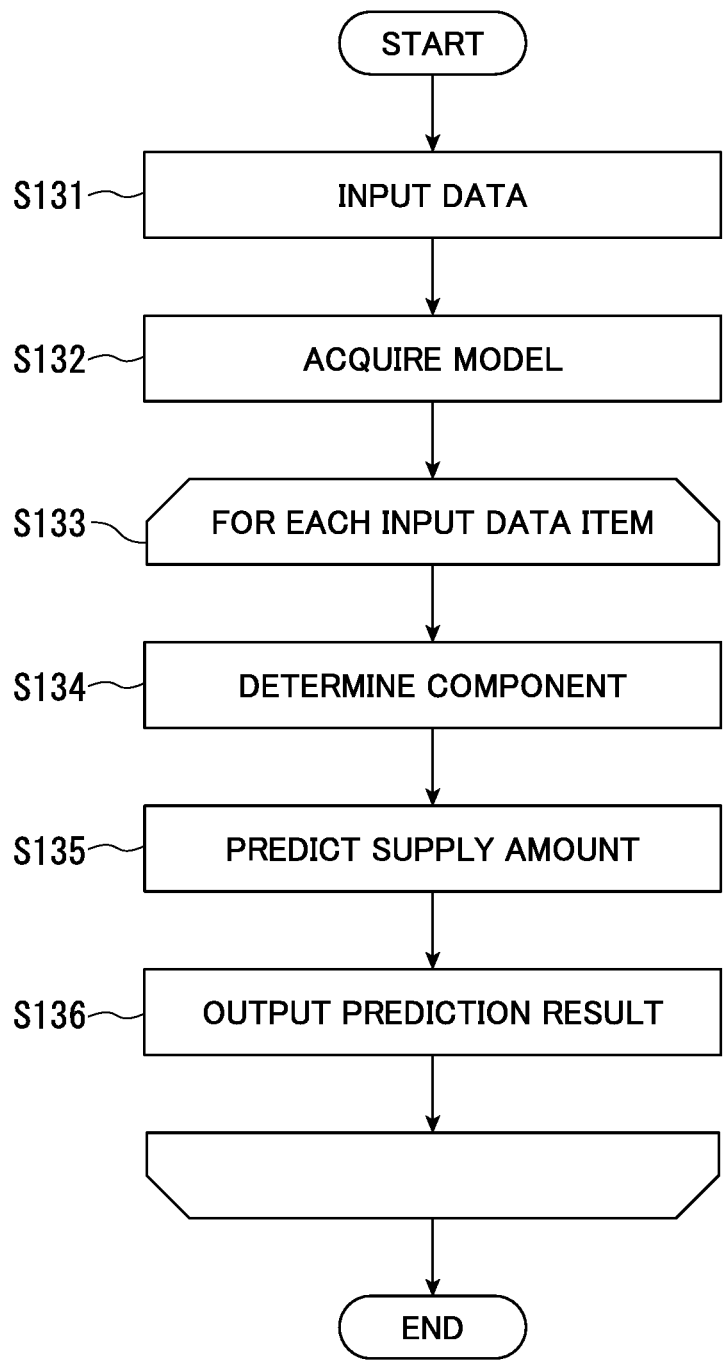
FIG. 10 is a flowchart showing an operation example of the supply amount prediction device according to at least one exemplary embodiment.

Next, an operation of the supply amount prediction device of the exemplary embodiment will be described. FIG. 10 is a flowchart showing an operation example of the supply amount prediction device according to at least one exemplary embodiment.

First, the data input device 701 inputs the input data 711 (step S131). The data input device 701 may input a plurality of input data items 711, not only one input data item 711. For example, the data input device 701 may input the input data items 711 for each given time point of the date of a given store. In a case where the data input device 701 inputs the plurality of input data items 711, the supply amount prediction unit 704 predicts the supply amount for each input data item 711. Next, the model acquisition unit 702 acquires the gating functions and the components from the model database 500 (step S132).

Next, the supply amount prediction device selects the input data 711 one by one, and executes processes from step S134 to step S136 for the selected input data 711 (step S133).

First, the component determination unit 703 determines components to be used for the prediction of the supply amount by following from the root node to the lowest-level node of the hierarchical latent structure, based on the gating functions acquired by the model acquisition unit 702 (step S134). In detail, the component determination unit 703 determines the components with the following procedure.

The component determination unit 703 reads out the gating functions related to the node for each node of the hierarchical latent structure. Next, the component determination unit 703 determines whether or not the input data 711 satisfies the read-out gating functions. Then, the component determination unit 703 determines a next child node to follow, based on the determined result. When reaching the lowest-level node by following the node of the hierarchical latent structure by the processes, the component determination unit 703 determines the component related to the node, to the components to be used for the prediction of the supply amount.

If the component determination unit 703 determines the component to be used for the prediction of the supply amount in step S134, the supply amount prediction unit 704 predicts the supply amount by substituting the input data 711 selected in the step S133 to the component (step S135). The prediction result output device 705 outputs the prediction result 712 of the supply amount obtained by the supply amount prediction unit 706 (step S136).

The supply amount prediction device 700 executes the processes from step S134 to step S136 for all input data items 711 and finishes the process.

As described above, according to the exemplary embodiment, the supply amount prediction device 700 can perform prediction of the supply amount with excellent accuracy, by using the appropriate components by the gating functions. Particularly, since the gating functions and the components are estimated without losing theoretical justification by the hierarchical latent variable model estimation device 100, the supply amount prediction device 700 can perform prediction of the supply amount using the components classified by the appropriate reference.

Exemplary Embodiment 2

The following describes Exemplary Embodiment 2 of a supply amount prediction system. A supply amount prediction system according to the exemplary embodiment differs from the supply amount prediction system 10 only in that the hierarchical latent variable model estimation device 100 is replaced with a hierarchical latent variable model estimation device 200.

Figure 11:
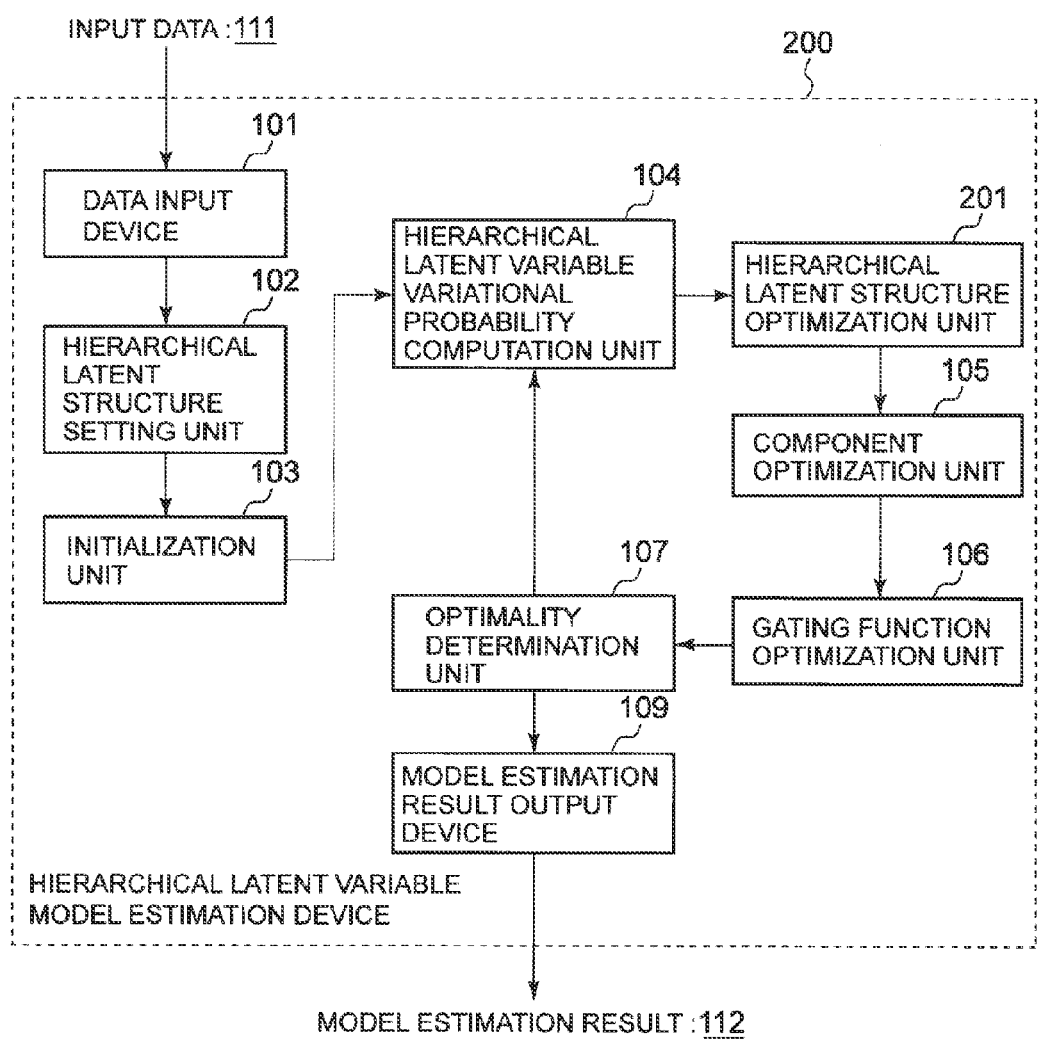
FIG. 11 is a block diagram showing a structure example of the hierarchical latent variable model estimation device according to at least one exemplary embodiment.

FIG. 11 is a block diagram showing a structure example of the hierarchical latent variable model estimation device according to at least one exemplary embodiment. The same structures as those in Exemplary Embodiment 1 are given the same reference signs as in FIG. 3, and their description is omitted. A hierarchical latent variable model estimation device 200 in this exemplary embodiment differs from the hierarchical latent variable model estimation device 100 only in that a hierarchical latent structure optimization unit 201 is connected and the optimal model selection unit 108 is not connected.

In Exemplary Embodiment 1, the hierarchical latent variable model estimation device 100 optimizes the model of gating functions and components for the hierarchical latent structure candidate, and selects the hierarchical latent structure for optimizing the optimization criterion A. In the hierarchical latent variable model estimation device 200 in this exemplary embodiment, on the other hand, a process whereby the hierarchical latent structure optimization unit 201 removes a path having a reduced latent variable from the model is added after the process by the hierarchical latent variable variational probability computation unit 104.

Figure 12:
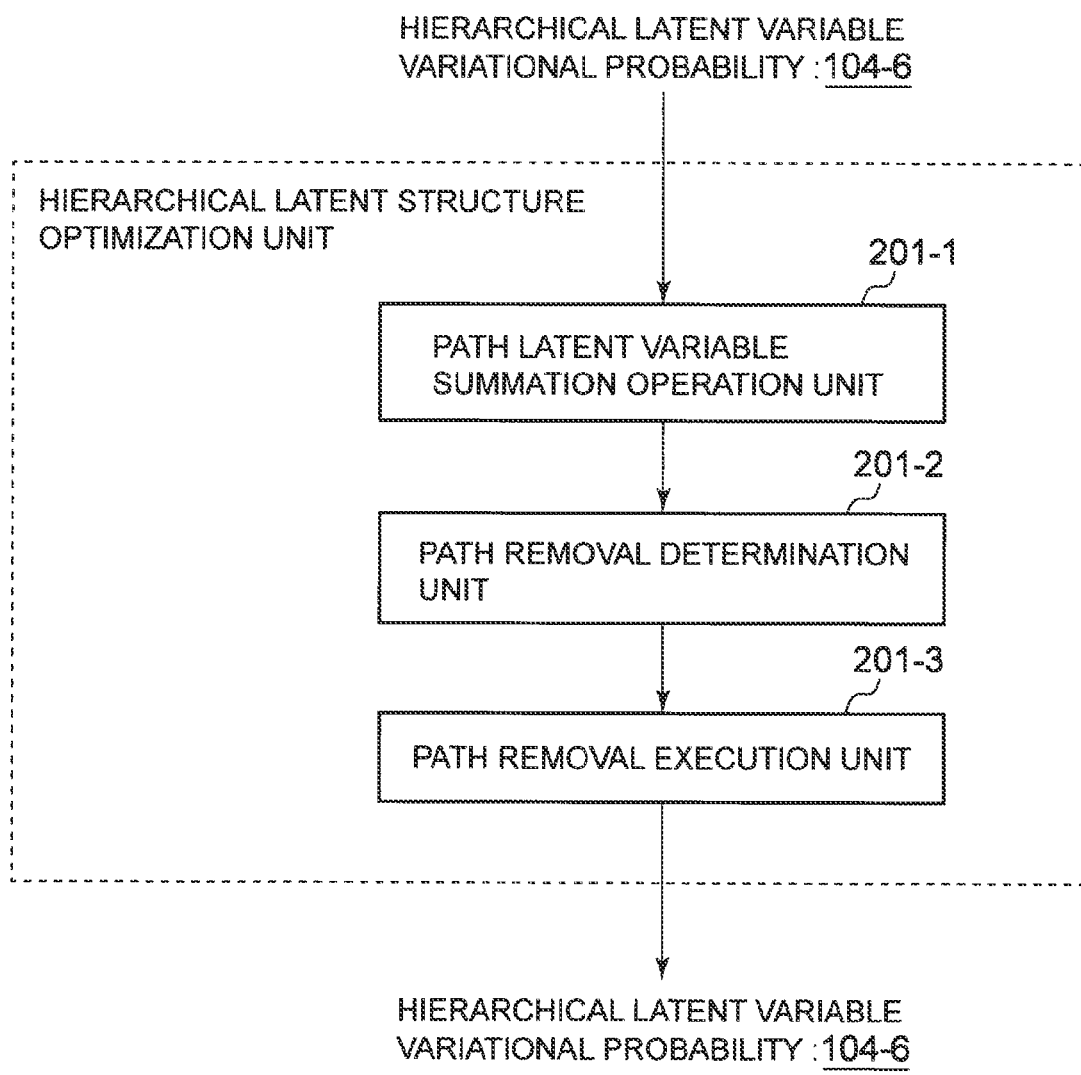
FIG. 12 is a block diagram showing a structure example of a hierarchical latent structure optimization unit according to at least one exemplary embodiment.

FIG. 12 is a block diagram showing a structure example of the hierarchical latent structure optimization unit 201 according to at least one exemplary embodiment. The hierarchical latent structure optimization unit 201 includes a path latent variable summation operation unit 201-1, a path removal determination unit 201-2, and a path removal execution unit 201-3.

The path latent variable summation operation unit 201-1 receives input of the hierarchical latent variable variational probability 104-6, and computes the sum (hereafter referred to as "sample sum") of lowest-level path latent variable variational probabilities in each component.

The path removal determination unit 201-2 determines whether or not the sample sum is less than or equal to a predetermined threshold $\epsilon$. Here, s is a threshold input together with the input data 111. In detail, the condition determined by the path removal determination unit 201-2 can be represented by, for example, the following Expression 5.

$$\sum_{n=1}^{N} q(z_{ij}^n) \le \epsilon \qquad \text{(Expression 5)}$$

That is, the path removal determination unit 201-2 determines whether or not the lowest-level path latent variable variational probability $q(z_{ij}^n)$ in each component satisfies the criterion defined by Expression 5 shown above. In other words, the path removal determination unit 201-2 determines whether or not the sample sum is sufficiently small.

The path removal execution unit 201-3 sets the variational probability of the path for which the sample sum is determined to be sufficiently small, to 0. The path removal execution unit 201-3 then re-computes the hierarchical latent variable variational probability 104-6 for each level using the lowest-level path latent variable variational probability normalized for each remaining path (i.e. path having a variational probability not set to 0), and outputs the re-computation result.

The validity of this process is described below. Expression 6, shown below as an example, is an update expression of $q(z_{ij}^n)$ in iterative optimization.

$$q^t(z_{ij}^n) \propto \qquad \text{(Expression 6)}$$

$$g_i^n g_{j|i}^n p(x^n \mid \phi_{ij}) \exp\left\{ \frac{-D_{\beta_i}}{2 \sum_{n=1}^{N} \sum_{j=1}^{K_2} q^{t-1}(z_{ij}^n)} + \frac{-D_{\phi_{ij}}}{2 \sum_{n=1}^{N} q^{t-1}(z_{ij}^n)} \right\}$$

In Expression 6 shown above, the negative term is included in the exponent part, and $q(z_{ij}^n)$ computed in the preceding process is present in the denominator of the term. Accordingly, the value of optimized $q(z_{ij}^n)$ is smaller when the denominator is smaller. Thus, a small path latent variable variational probability is gradually reduced through iterative computation.

Note that the hierarchical latent structure optimization unit 201 (more specifically, the path latent variable summation operation unit 201-1, the path removal determination unit 201-2, and the path removal execution unit 201-3) is realized by a CPU of a computer operating according to a program (hierarchical latent variable model estimation program).

Figure 13:
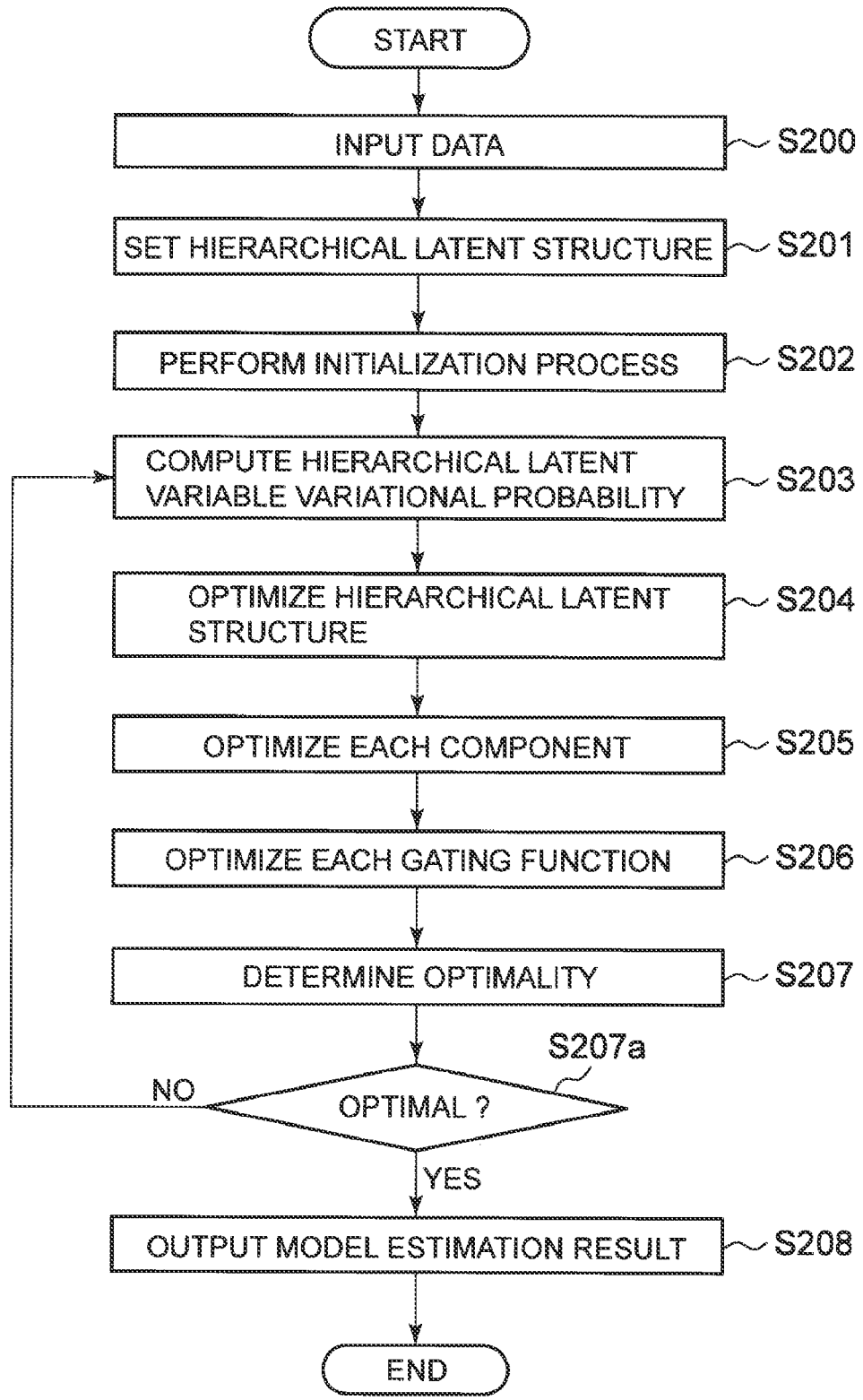
FIG. 13 is a flowchart showing an operation example of the hierarchical latent variable model estimation device according to at least one exemplary embodiment.

The following describes the operation of the hierarchical latent variable model estimation device 200 in this exemplary embodiment. FIG. 13 is a flowchart showing an operation example of the hierarchical latent variable model estimation device 200 according to at least one exemplary embodiment.

First, the data input device 101 inputs the input data 111 (step S200). Next, the hierarchical latent structure setting unit 102 sets an initial state of the number of hidden states as the hierarchical latent structure (step S201).

In Exemplary Embodiment 1, the plurality of candidates are all executed for the number of components to search for the optimal solution. In this exemplary embodiment, on the other hand, the number of components can be optimized, too, so that the hierarchical latent structure can be optimized in one operation. Therefore, in step S201, only the initial value of the number of hidden states needs to be set once, unlike step S102 in Exemplary Embodiment 1 where the candidate which has not been optimized is selected from the plurality of candidates.

Next, the initialization unit 103 performs the initialization process of the latent variable variational probability and the parameter used for estimation, for the set hierarchical latent structure (step S202).

Next, the hierarchical latent variable variational probability computation unit 104 computes the variational probability of each path latent variable (step S203). Next, the hierarchical latent structure optimization unit 201 optimizes the hierarchical latent structure by estimating the number of components (step S204). That is, since the components are located at the lowest-level nodes, when optimizing the hierarchical latent structure, the number of components is optimized, too.

Next, the component optimization unit 105 optimizes each component by estimating the type of observation probability and the parameter (step S205). Next, the gating function optimization unit 106 optimizes the branch parameter in each branch node (step S206). Next, the optimality determination unit 107 determines whether or not the optimization criterion A has converged (step S207). That is, the optimality determination unit 107 determines the optimality of the model.

In the case where, in step S207, it is not determined that the optimization criterion A has converged, i.e. it is determined that the model is not optimal (step S207*a*: No), the processes of steps S203 to S207 are repeated.

In the case where, in step S207, it is determined that the optimization criterion A has converged, i.e. it is determined that the model is optimal (step S207*a*: Yes), on the other hand, the model estimation result output device 109 outputs the model estimation result, and ends the process (step S208).

Figure 14:
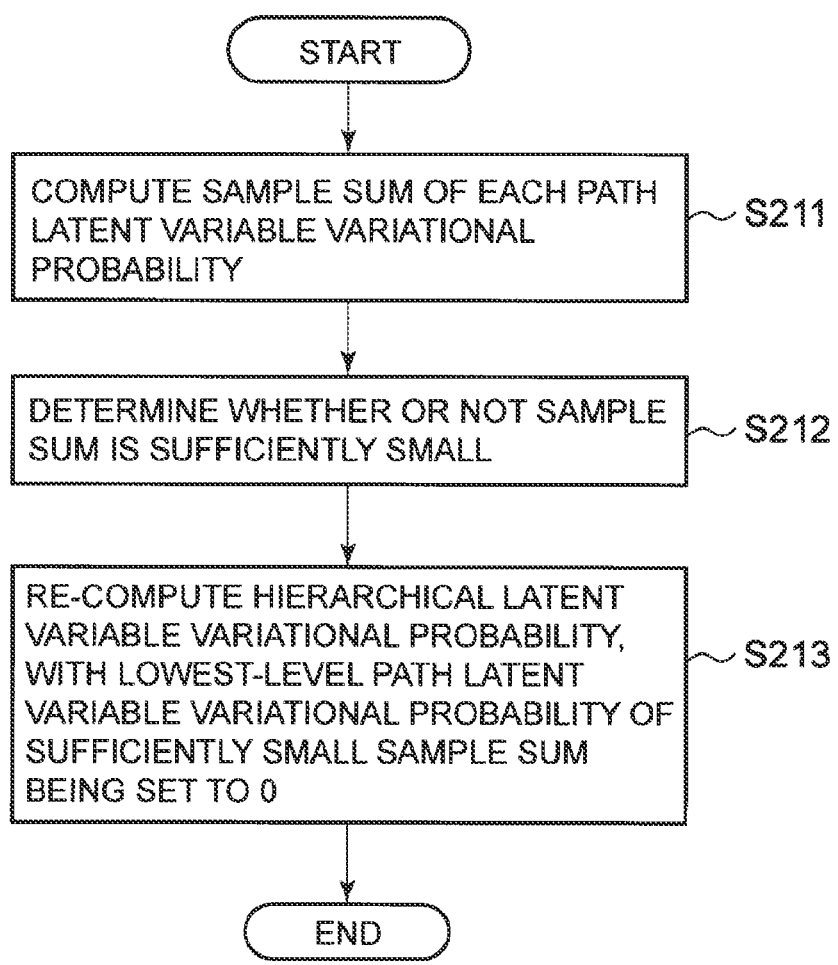
FIG. 14 is a flowchart showing an operation example of the hierarchical latent structure optimization unit according to at least one exemplary embodiment.

The following describes the operation of the hierarchical latent structure optimization unit 201 in this exemplary embodiment. FIG. 14 is a flowchart showing an operation example of the hierarchical latent structure optimization unit 201 according to at least one exemplary embodiment.

First, the path latent variable summation operation unit 201-1 computes the sample sum of path latent variables (step S211). Next, the path removal determination unit 201-2 determines whether or not the computed sample sum is sufficiently small (step S212). Next, the path removal execution unit 201-3 outputs the hierarchical latent variable variational probability re-computed in a state where the lowest-level path latent variable variational probability for which the sample sum is determined to be sufficiently small is set to 0, and ends the process (step S213).

As described above, in this exemplary embodiment, the hierarchical latent structure optimization unit 201 optimizes the hierarchical latent structure by removing, from the model, the path having a computed variational probability is less than or equal to the predetermined threshold.

According to such a structure, in addition to the advantageous effects of Exemplary Embodiment 1, the number of components can be optimized in one operation, with there being no need to optimize the plurality of hierarchical latent structure candidates as in the hierarchical latent variable model estimation device 100. This enables the number of components, the type and parameter of observation probability, and the variational distribution to be estimated simultaneously, so that computation costs can be reduced.

Exemplary Embodiment 3

The following describes Exemplary Embodiment 3 of a supply amount prediction system. In the supply amount prediction system according to the exemplary embodiment, the configuration of the hierarchical latent variable model estimation device differs from that of Exemplary Embodiment 2. The hierarchical latent variable model estimation device in this exemplary embodiment differs from the hierarchical latent variable model estimation device 200 only in that the gating function optimization unit 106 is replaced by a gating function optimization unit 113.

Figure 15:
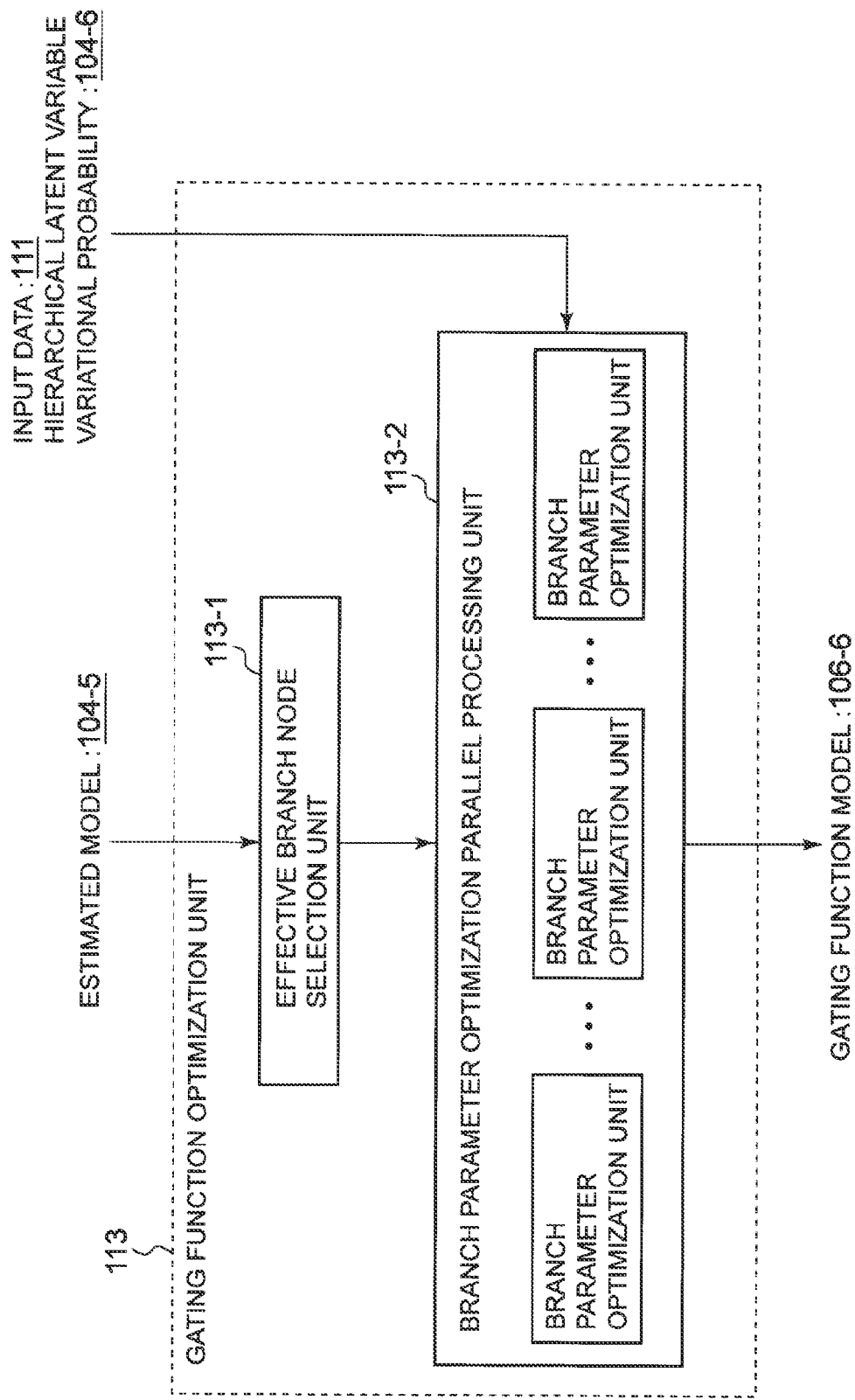
FIG. 15 is a block diagram showing a structure example of the gating function optimization unit according to at least one exemplary embodiment.

FIG. 15 is a block diagram showing a structure example of the gating function optimization unit 113 in Exemplary Embodiment 3. The gating function optimization unit 113 includes an effective branch node selection unit 113-1 and a branch parameter optimization parallel processing unit 113-2.

The effective branch node selection unit 113-1 selects only effective branch nodes from the hierarchical latent structure. In detail, through the use of the model 104-5 estimated by the component optimization unit 105, the effective branch node selection unit 113-1 selects only the effective branch nodes by taking into account the path removed from the model. Thus, an effective branch node means a branch node on a path not removed from the hierarchical latent structure.

The branch parameter optimization parallel processing unit 113-2 performs the branch parameter optimization process for the effective branch nodes in parallel, and outputs the gating function model 106-6. In detail, the branch parameter optimization parallel processing unit 113-2 optimizes the branch parameters for all effective branch nodes simultaneously in parallel, using the input data 111 and the hierarchical latent variable variational probability 104-6 computed by the hierarchical latent variable variational probability computation unit 104.

For instance, the branch parameter optimization parallel processing unit 113-2 may include the branch parameter optimization units 106-3 in Exemplary Embodiment 1 arranged in parallel, as exemplified in FIG. 15. Such a structure allows the branch parameters of all gating functions to be optimized at one time.

That is, while the hierarchical latent variable model estimation devices 100 and 200 execute the optimization process of the gating functions one at a time, the hierarchical latent variable model estimation device in this exemplary embodiment can execute the optimization process of the gating functions in parallel, which contributes to faster model estimation.

Note that the gating function optimization unit 113 (more specifically, the effective branch node selection unit 113-1 and the branch parameter optimization parallel processing unit 113-2) is realized by a CPU of a computer operating according to a program (hierarchical latent variable model estimation program).

Figure 16:
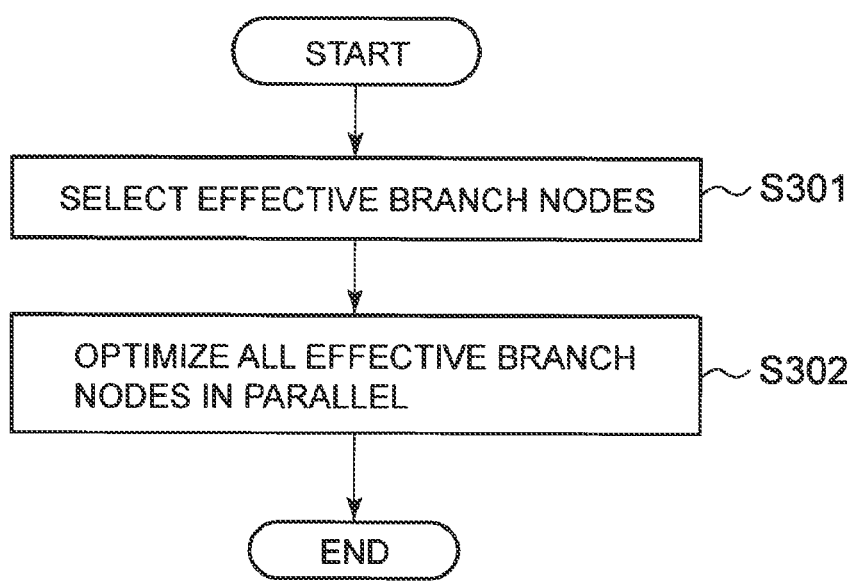
FIG. 16 is a flowchart showing an operation example of the gating function optimization unit according to at least one exemplary embodiment.

The following describes the operation of the gating function optimization unit 113 in this exemplary embodiment. FIG. 16 is a flowchart showing an operation example of the gating function optimization unit 113 according to at least one exemplary embodiment. First, the effective branch node selection unit 113-1 selects all effective branch nodes (step S301). Next, the branch parameter optimization parallel processing unit 113-2 optimizes all effective branch nodes in parallel, and ends the process (step S302).

As described above, according to this exemplary embodiment, the effective branch node selection unit 113-1 selects the effective branch nodes from the hierarchical latent structure nodes, and the branch parameter optimization parallel processing unit 113-2 optimizes the gating function model based on the variational probability of the latent variable in each effective branch node. Here, the branch parameter optimization parallel processing unit 113-2 optimizes the branch parameters for the effective branch nodes in parallel. Thus, the optimization process of the gating functions can be performed in parallel, so that faster model estimation can be achieved in addition to the advantageous effects of the foregoing exemplary embodiments.

Basic Structure

Figure 17:
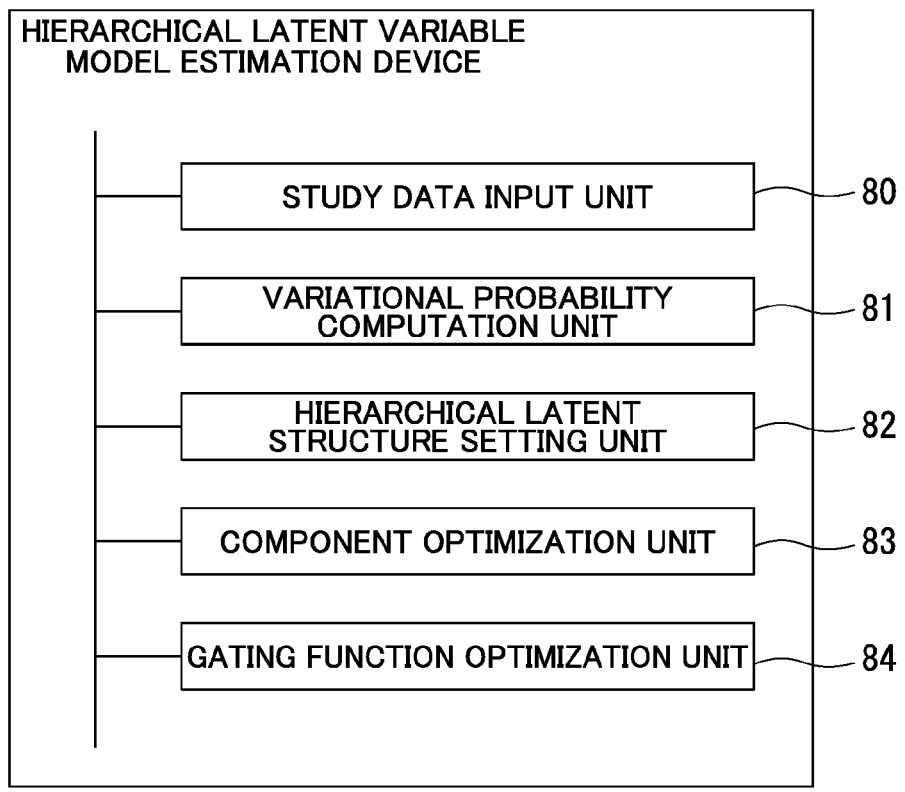
FIG. 17 is a block diagram showing a basic structure of the hierarchical latent variable model estimation device.

Next, a basic structure of the hierarchical latent variable model estimation device will be described. FIG. 17 is a block diagram showing a basic structure of the hierarchical latent variable model estimation device.

The hierarchical latent variable model estimation device estimates the hierarchical latent variable models for predicting the supply amount of the product. The hierarchical latent variable model estimation device includes a study data input unit 80, a hierarchical latent structure setting unit 81, a variational probability computation unit 82, a component optimization unit 83, and a gating function optimization unit 84, as a basic structure.

The study data input unit 80 inputs data for study which is a plurality of combinations of a response variable which is a known supply amount of a product and one or more explanatory variables which are information items which can influence the supply amount. As an example of the study data input unit 80, the data input device 101 is used.

The hierarchical latent structure setting unit 81 sets a hierarchical latent structure that is a structure in which latent variables are represented by a tree structure and components representing probability models are located at nodes of a lowest level of the tree structure. As an example of the hierarchical latent structure setting unit 81, the hierarchical latent structure setting unit 102 is used.

The variational probability computation unit 82 computes a variational probability (for example, optimization criterion A) of a path latent variable that is a latent variable included in a path linking a root node to a target node in the hierarchical latent structure, based on data for study input by the study data input unit 80 and the components. As an example of the variational probability computation unit 82, the hierarchical latent variable variational probability computation unit 104 is used.

The component optimization unit 83 optimizes each of the components for the computed variational probability, based on the data for study input by the study data input unit 80. As an example of the component optimization unit 83, the component optimization unit 105 is used.

The gating function optimization unit 84 optimizes a gating function model that is a model for determining a branch direction according to the explanatory variables in a node of the hierarchical latent structure, based on the variational probability of the latent variable in the node. As an example of the gating function optimization unit 84, the gating function optimization unit 106 is used.

According to such a structure, the hierarchical latent variable model estimation device can estimate a hierarchical latent variable model including hierarchical latent variables with appropriate computational complexity without losing theoretical justification.

Moreover, the hierarchical latent variable model estimation device may include a hierarchical latent structure optimization unit (e.g. the hierarchical latent structure optimization unit 201) for optimizing the hierarchical latent structure by removing, from the model, a path having a computed variational probability is less than or equal to a predetermined threshold. According to such a structure, the number of components can be optimized in one operation, with there being no need to optimize a plurality of hierarchical latent structure candidates.

Moreover, the gating function optimization unit 84 may include: an effective branch node selection unit (e.g. the effective branch node selection unit 113-1) for selecting an effective branch node from nodes of the hierarchical latent structure, the effective branch node being a branch node of a path not removed from the hierarchical latent structure; and a gating function optimization parallel processing unit (e.g. the branch parameter optimization parallel processing unit 113-2) for optimizing the gating function model based on the variational probability of the latent variable in the effective branch node. The gating function optimization parallel processing unit may perform optimization of each branch parameter for the effective branch node in parallel. According to such a structure, faster model estimation can be achieved.

Moreover, the hierarchical latent structure setting unit 81 may set the hierarchical latent structure in which the latent variables are represented by a binary tree structure. The gating function optimization unit 84 may then optimize the gating function model based on a Bernoulli distribution, based on the variational probability of the latent variable in the node. In this case, each parameter has an analytical solution, which contributes to faster optimization.

In detail, the variational probability computation unit 82 may compute the variational probability of the latent variable so as to maximize the marginal log-likelihood.

Figure 18:
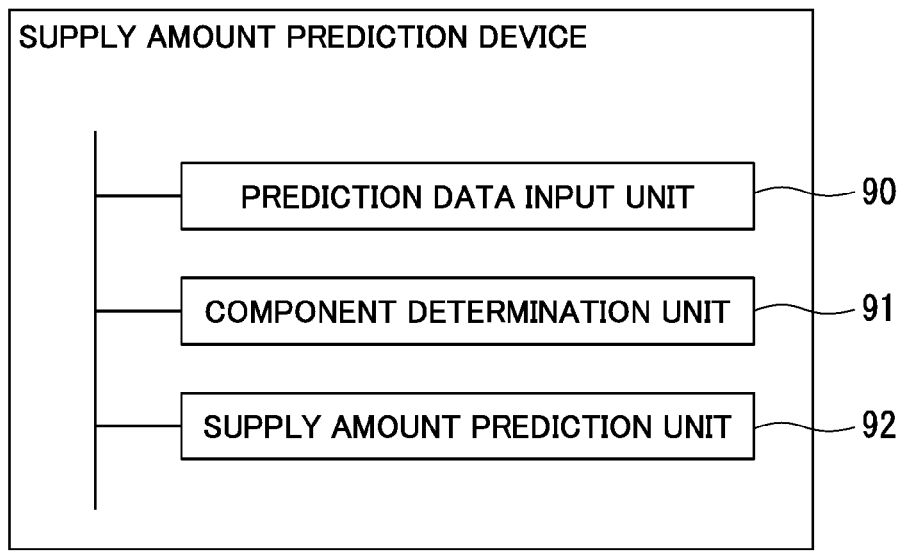
FIG. 18 is a block diagram showing a basic structure of the supply amount prediction device.

Next, the following describes a basic structure of a supply amount prediction device. FIG. 18 is a block diagram showing the basic structure of the supply amount prediction device.

The supply amount prediction device includes a prediction data input unit, a component determination unit, and a supply amount prediction unit.

A prediction data input unit 90 inputs data for prediction which are one or more explanatory variables which are information items which can influence a supply amount of a product. As an example of the prediction data input unit 90, the data input device 701 is used.

A component determination unit 91 determines components to be used for prediction of the supply amount, based on a hierarchical latent structure that is a structure in which latent variables are represented by a tree structure and components representing probability models are located at nodes of a lowest level of the tree structure, a gating function for determining a branch direction in a node of the hierarchical latent structure, and the data for prediction. As an example of the component determination unit 91, the component determination unit 703 is used.

A supply amount prediction unit 92 predicts the supply amount, based on the component determined by the component determination unit 91 and the data for prediction. As an example of the supply amount prediction unit 92, the supply amount prediction unit 704 is used.

According to such a structure, the supply amount prediction device can perform prediction of the supply amount with an excellent accuracy, by using the appropriate components by the gating functions.

Figure 19:
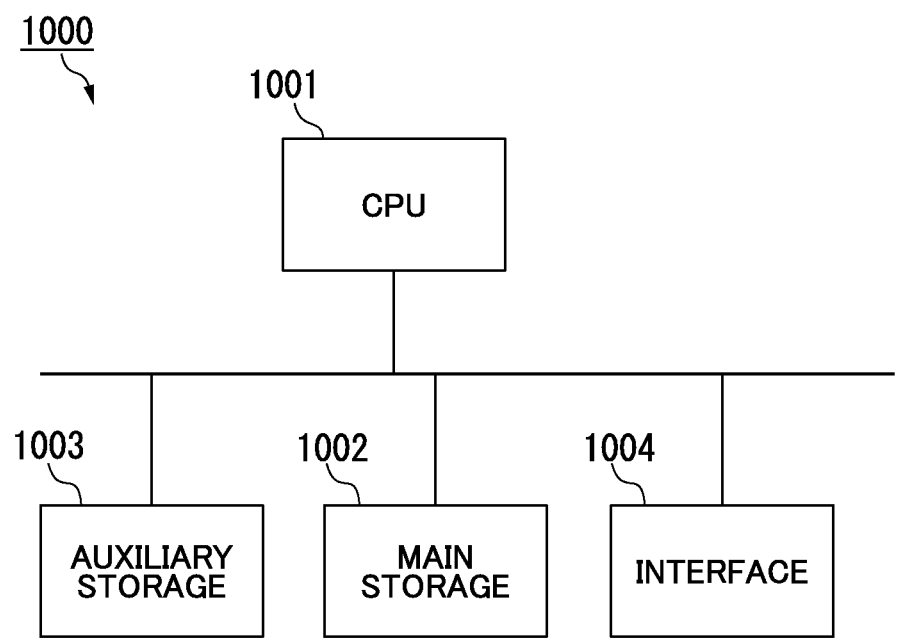
FIG. 19 is a schematic block diagram showing a structure of a computer according to at least one exemplary embodiment.

FIG. 19 is a schematic block diagram showing a structure of a computer according to at least one exemplary embodiment.

A computer 1000 includes a CPU 1001, a main storage 1002, an auxiliary storage 1003, and an interface 1004.

The hierarchical latent variable model estimation device or the supply amount prediction device described above is mounted on the computers 1000, respectively. In addition, the computer 1000 on which the hierarchical latent variable model estimation device is mounted and the computer 1000 on which the supply amount prediction device is mounted may be different from each other. The operation of each processing unit described above is stored in the auxiliary storage 1003 in a form of a program (estimation program of the hierarchical latent variable model or supply amount prediction program). The CPU 1001 reads out the program from the auxiliary storage 1003 to expand the program in the main storage 1002, and executes the process described above according to the program.

In at least one exemplary embodiment, the auxiliary storage 1003 is an example of a non-transitory tangible medium. Other examples of the non-transitory tangible medium include a magnetic disc, a magneto optical disk, a CD-ROM, a DVD-ROM, a semiconductor memory or the like connected through the interface 1004. In addition, in a case where the program is delivered to the computer 1000 by a communication line, the computer 1000 to which the delivery is performed, may expand the program in the main storage 1002, and may execute the process.

In addition, the program may be used for realizing a part of the functions described above. Further, the program may be a program for realizing the functions described above by being combined with the other program previously stored in the auxiliary storage 1003, which is a so-called difference file (difference program).

What is claimed is:

1. A hierarchical latent variable model estimation device for estimating a hierarchical latent variable model for predicting a supply amount of a product, the hierarchical latent variable model estimation device comprising:
   a study data input unit for inputting data for study which is a plurality of combinations of a response variable which is a known supply amount of a product and one or more explanatory variables which are information items which can influence the supply amount;
   a hierarchical latent structure setting unit for setting a hierarchical latent structure that is a structure in which latent variables are represented by a tree structure and components representing probability models are located at nodes of a lowest level of the tree structure;
   a variational probability computation unit for computing a variational probability of a path latent variable that is a latent variable included in a path linking a root node to a target node in the hierarchical latent structure, based on data for study input by the study data input unit and the components;
   a component optimization unit for optimizing each of the components for the computed variational probability, based on the data for study input by the study data input unit; and
   a gating function optimization unit for optimizing a gating function model that is a model for determining a branch direction according to the explanatory variables in a node of the hierarchical latent structure, based on the variational probability of the latent variable in the node.

2. The hierarchical latent variable model estimation device according to claim 1, further comprising
   a hierarchical latent structure optimization unit for optimizing the hierarchical latent structure by removing, from the model, a path having a computed variational probability is less than or equal to a predetermined threshold.

3. The hierarchical latent variable model estimation device according to claim 2, wherein the gating function optimization unit includes:
   an effective branch node selection unit for selecting an effective branch node from nodes of the hierarchical latent structure, the effective branch node being a branch node of a path not removed from the hierarchical latent structure; and
   a gating function optimization parallel processing unit for optimizing the gating function model based on the variational probability of the latent variable in the effective branch node, and
   wherein the gating function optimization parallel processing unit performs optimization of each branch parameter for the effective branch node in parallel.

4. The hierarchical latent variable model estimation device according to claim 1, wherein the hierarchical latent structure setting unit sets the hierarchical latent structure in which the latent variables are represented by a binary tree structure, and
   wherein the gating function optimization unit optimizes the gating function model based on a Bernoulli distribution, based on the variational probability of the latent variable in the node.

5. The hierarchical latent variable model estimation device according to claim 1, wherein the variational probability computation unit computes the variational probability of the latent variables so as to maximize a marginal log-likelihood.

6. A hierarchical latent variable model estimation method for estimating a hierarchical latent variable model for predicting a supply amount of a product, the hierarchical latent variable model estimation method comprising:
   inputting data for study which is a plurality of combinations of response variable which is a known supply amount of a product and one or more explanatory variables which are information items which can influence the supply amount;
   setting a hierarchical latent structure that is a structure in which latent variables are represented by a tree structure and components representing probability models are located at nodes of a lowest level of the tree structure;
   computing a variational probability of a path latent variable that is a latent variable included in a path linking a root node to a target node in the hierarchical latent structure, based on the input data for study and the components;
   optimizing each of the components for the computed variational probability, based on the input data for study; and
   optimizing a gating function model that is a model for determining a branch direction according to the explanatory variables in a node of the hierarchical latent structure, based on the variational probability of the latent variable in the node.

7. The hierarchical latent variable model estimation method according to claim 6, further comprising
   optimizing the hierarchical latent structure by removing, from the model, a path having a computed variational probability is less than or equal to a predetermined threshold.

8. A non-transitory tangible recording medium having recorded thereon a hierarchical latent variable model estimation program for estimating a hierarchical latent variable model for predicting a supply amount of a product, the hierarchical latent variable model estimation program causing a computer to execute:

a data for study input process of inputting data for study which is a plurality of combinations of a response variable which is known supply amount of a product and one or more explanatory variables which are information items which can influence the supply amount;

a hierarchical latent structure setting process of setting a hierarchical latent structure that is a structure in which latent variables are represented by a tree structure and components representing probability models are located at nodes of a lowest level of the tree structure;

a variational probability computation process of computing a variational probability of a path latent variable that is a latent variable included in a path linking a root node to a target node in the hierarchical latent structure, based on the data for study input by a study data input unit and the components;

a component optimization process of optimizing each of the components for the computed variational probability, based on the data for study input by the study data input unit; and a gating function optimization process of optimizing a gating function model that is a model for determining a branch direction according to the multivariate data in a node of the hierarchical latent structure, based on the variational probability of the latent variable in the node.

9. The recording medium according to claim 8, wherein the hierarchical latent variable model estimation program further causes the computer to execute a hierarchical latent structure optimization process of optimizing the hierarchical latent structure by removing, from the model, a path having a computed variational probability is less than or equal to a predetermined threshold.

10. A supply amount prediction device for predicting a supply amount of a product, the supply amount prediction device comprising:

a prediction data input unit for inputting data for prediction which are one or more explanatory variables which are information items which can influence a supply amount of a product;

a component determination unit for determining components to be used for prediction of the supply amount, based on a hierarchical latent structure that is a structure in which latent variables are represented by a tree structure and components representing probability models are located at nodes of a lowest level of the tree structure, a gating function for determining a branch direction in a node of the hierarchical latent structure, and the data for prediction; and a supply amount prediction unit for predicting the supply amount, based on the component determined by the component determination unit and the data for prediction.

11. A supply amount prediction method for predicting a supply amount of a product, the supply amount prediction method comprising:

inputting data for prediction which are one or more explanatory variables which are information items which can influence the supply amount of a product;

determining components to be used for prediction of the supply amount, based on a hierarchical latent structure that is a structure in which latent variables are represented by a tree structure and components representing probability models are located at nodes of a lowest level of the tree structure, a gating function for determining a branch direction in a node of the hierarchical latent structure, and the data for prediction; and predicting the supply amount, based on the component determined and the data for prediction.

12. A non-transitory tangible recording medium having recorded thereon a supply amount prediction program for predicting a supply amount of a product, the supply amount prediction program causing a computer to execute:

a data for prediction input process of inputting data for prediction which are one or more explanatory variables which are information items which can influence the supply amount of a product;

a component determination process of determining components to be used for prediction of the supply amount, based on a hierarchical latent structure that is a structure in which latent variables are represented by a tree structure and components representing probability models are located at nodes of a lowest level of the tree structure, a gating function for determining a branch direction in a node of the hierarchical latent structure, and the data for prediction; and a supply amount prediction process of predicting the supply amount, based on the component determined by the component determination unit and the data for prediction.

13. A supply amount prediction system for predicting a supply amount of a product, the supply amount prediction system comprising:

a study data input unit for inputting data for study which is a plurality of combinations of a response variable which is a known supply amount of a product and one or more explanatory variables which are information items which can influence the supply amount;

a hierarchical latent structure setting unit for setting a hierarchical latent structure that is a structure in which latent variables are represented by a tree structure and components representing probability models are located at nodes of a lowest level of the tree structure;

a variational probability computation unit for computing a variational probability of a path latent variable that is a latent variable included in a path linking a root node to a target node in the hierarchical latent structure, based on data for study input by the study data input unit and the components;

a component optimization unit for optimizing each of the components for the computed variational probability, based on the data for study input by the study data input unit;

a gating function optimization unit for optimizing a gating function model that is a model for determining a branch direction according to the explanatory variables in a node of the hierarchical latent structure, based on the variational probability of the latent variable in the node;

a prediction data input unit for inputting data for prediction which are one or more explanatory variables which are information items which can influence the supply amount of a product;

a component determination unit for determining components to be used for prediction of the supply amount, among the components optimized by the component optimization unit, based on the gating function optimized by the gating function optimization unit and the data for prediction; and a supply amount prediction unit for predicting the supply amount, based on the component determined by the component determination unit and the data for prediction.

14. A supply amount prediction method for predicting a supply amount of a product, the supply amount prediction method comprising:

inputting data for study which is a plurality of combinations of a response variable which is a known supply amount of a product and one or more explanatory variables which are information items which can influence the supply amount;

setting a hierarchical latent structure that is a structure in which latent variables are represented by a tree structure and components representing probability models are located at nodes of a lowest level of the tree structure;

computing a variational probability of a path latent variable that is a latent variable included in a path linking a root node to a target node in the hierarchical latent structure, based on the input data for study and the components;

optimizing each of the components for the computed variational probability, based on the input data for study;

optimizing a gating function model that is a model for determining a branch direction according to the explanatory variables in a node of the hierarchical latent structure, based on the variational probability of the latent variable in the node;

inputting data for prediction which are one or more explanatory variables which are information items which can influence a supply amount of a product;

determining components to be used for prediction of the supply amount, among the components optimized, based on the gating function optimized and the data for prediction; and predicting the supply amount, based on the determined components and the data for prediction.

15. A non-transitory tangible recording medium having recorded thereon a hierarchical latent variable model for predicting a supply amount of a product, the recording medium having recorded thereon optimized components and optimized gating function obtained by:

inputting data for study which is a plurality of combinations of a response variable which is a known supply amount of a product and one or more explanatory variables which are information items which can influence the supply amount;

setting a hierarchical latent structure that is a structure in which latent variables are represented by a tree structure and components representing probability models are located at nodes of a lowest level of the tree structure;

computing a variational probability of a path latent variable that is a latent variable included in a path linking a root node to a target node in the hierarchical latent structure, based on the input data for study and the components;

optimizing each of the components for the computed variational probability, based on the input data for study; and optimizing a gating function model that is a model for determining a branch direction according to the explanatory variables in a node of the hierarchical latent structure, based on the variational probability of the latent variable in the node.

* * * * *